July 10, 1934.                J. H. ROBERTS                1,965,808
                    FABRICATING MACHINE FOR LONG STOCK
                    Filed Oct. 31, 1929        10 Sheets-Sheet 1
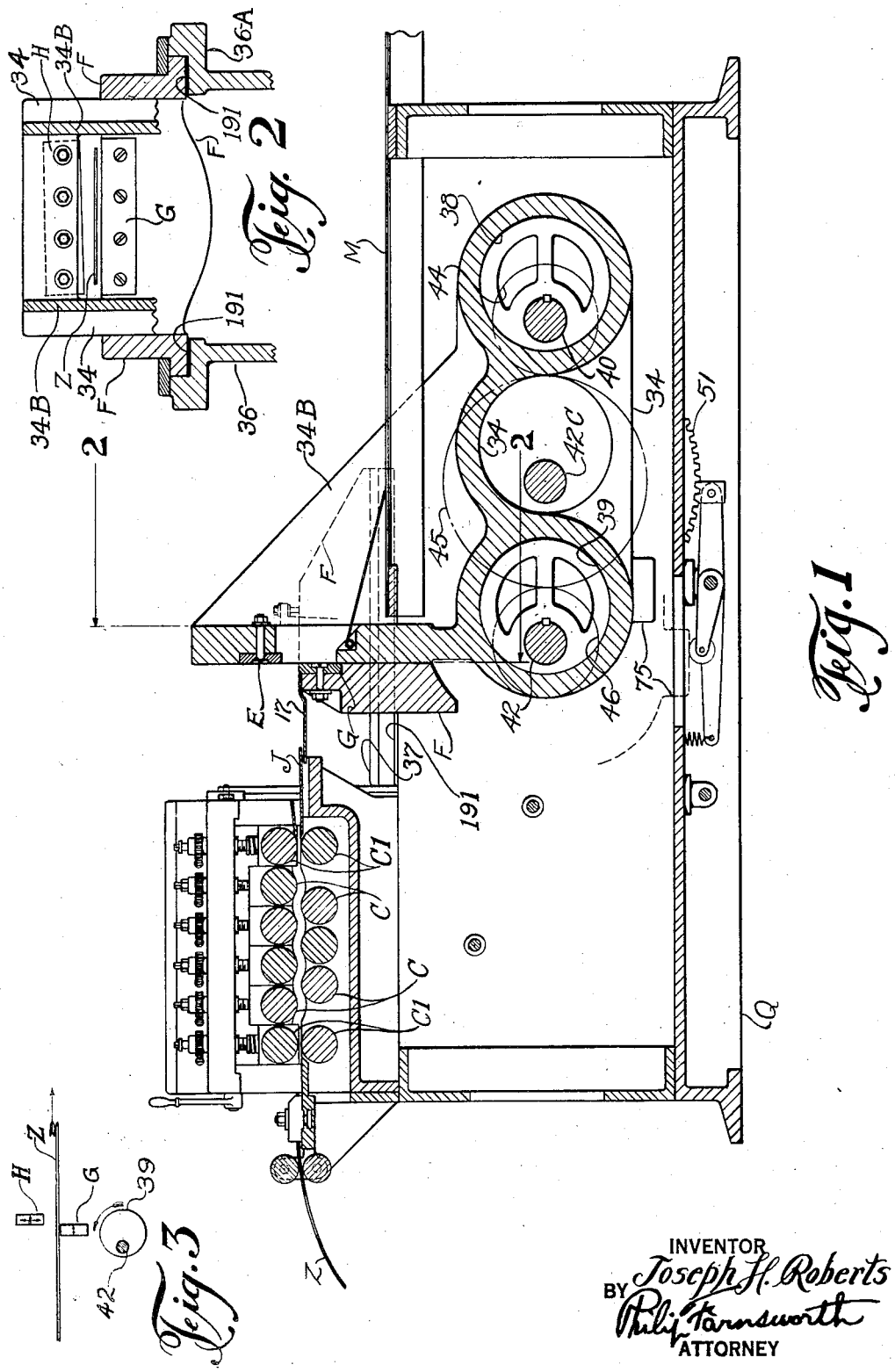
INVENTOR
Joseph H. Roberts
BY
Philip Farnsworth
ATTORNEY

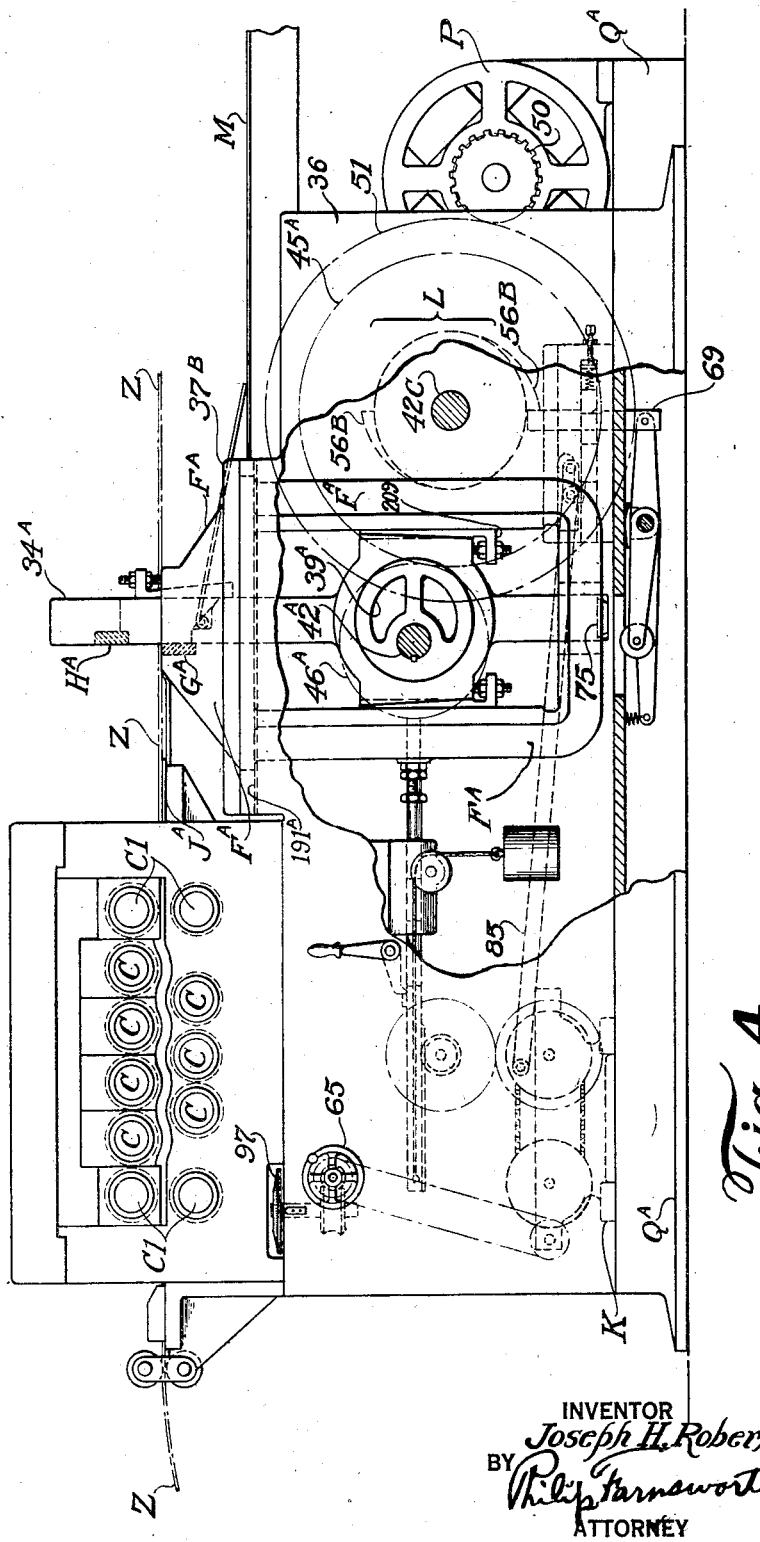

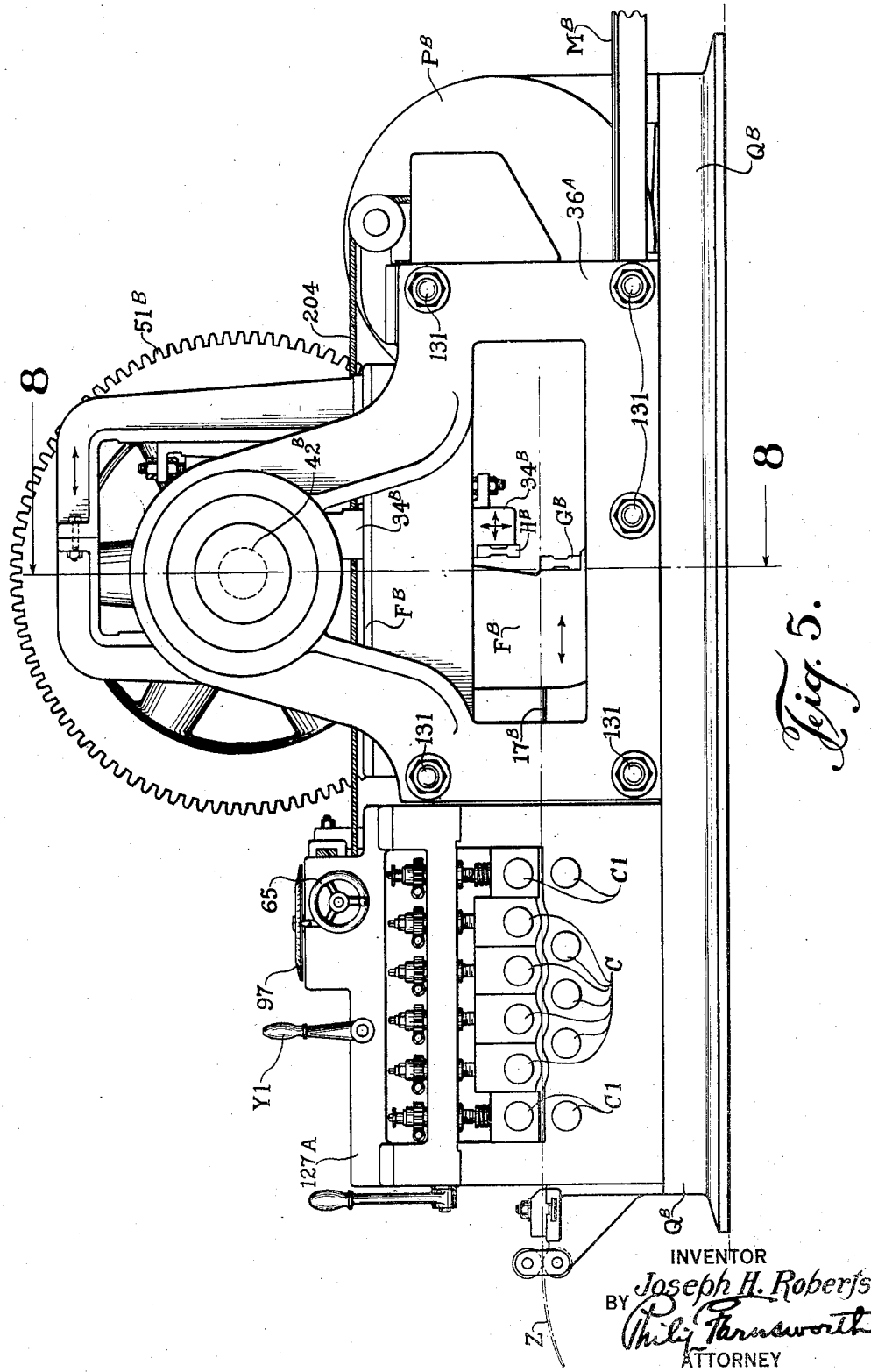

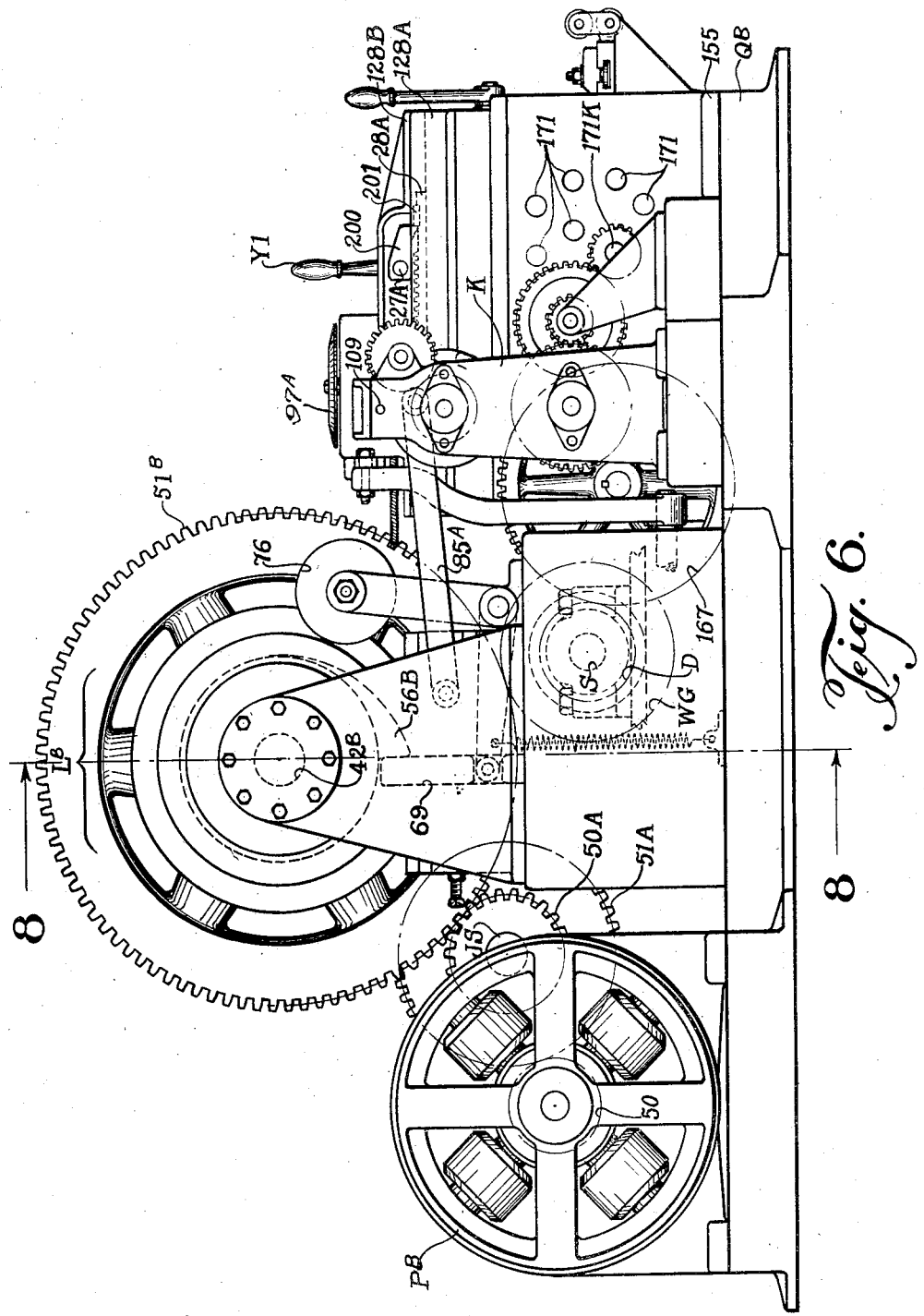

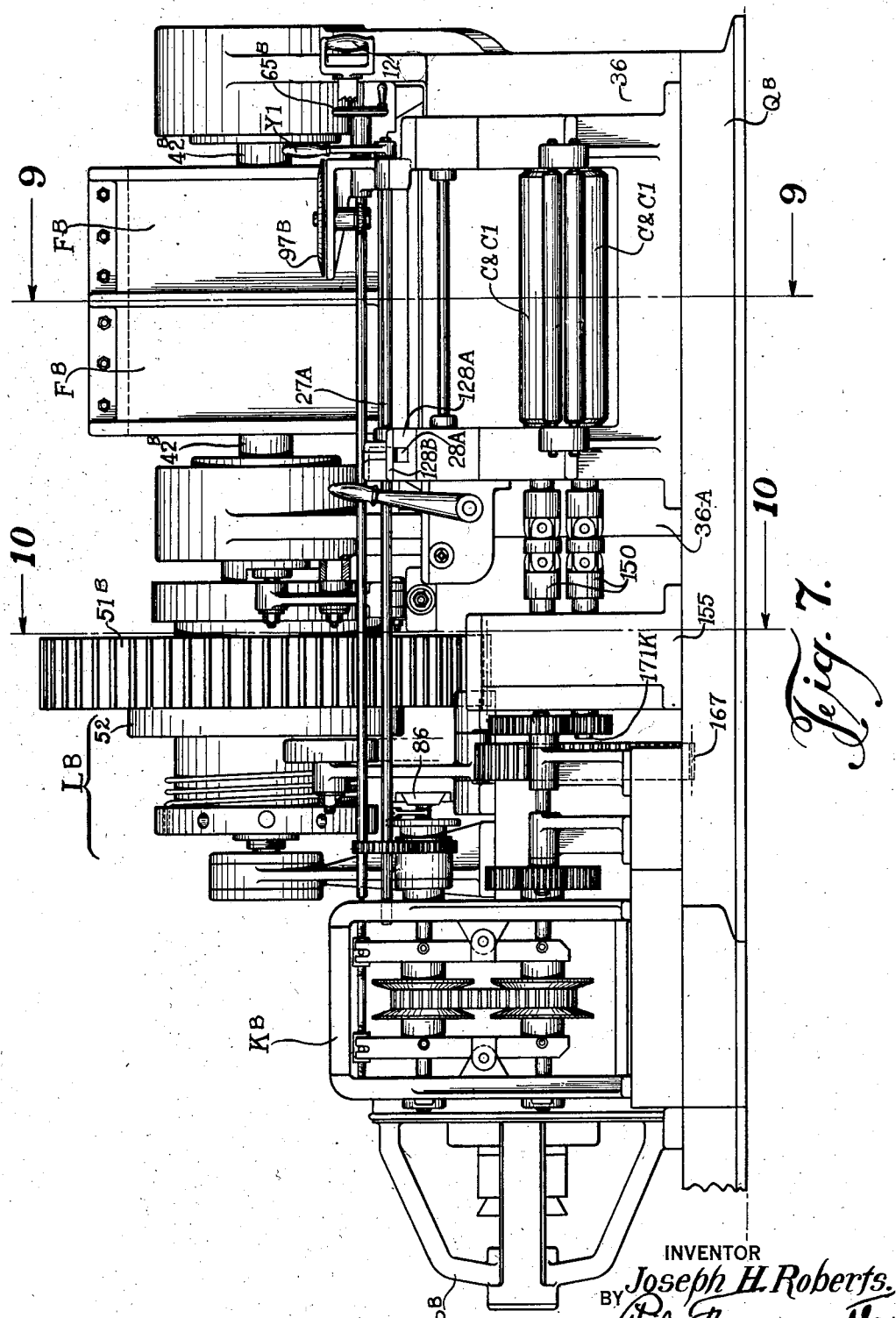

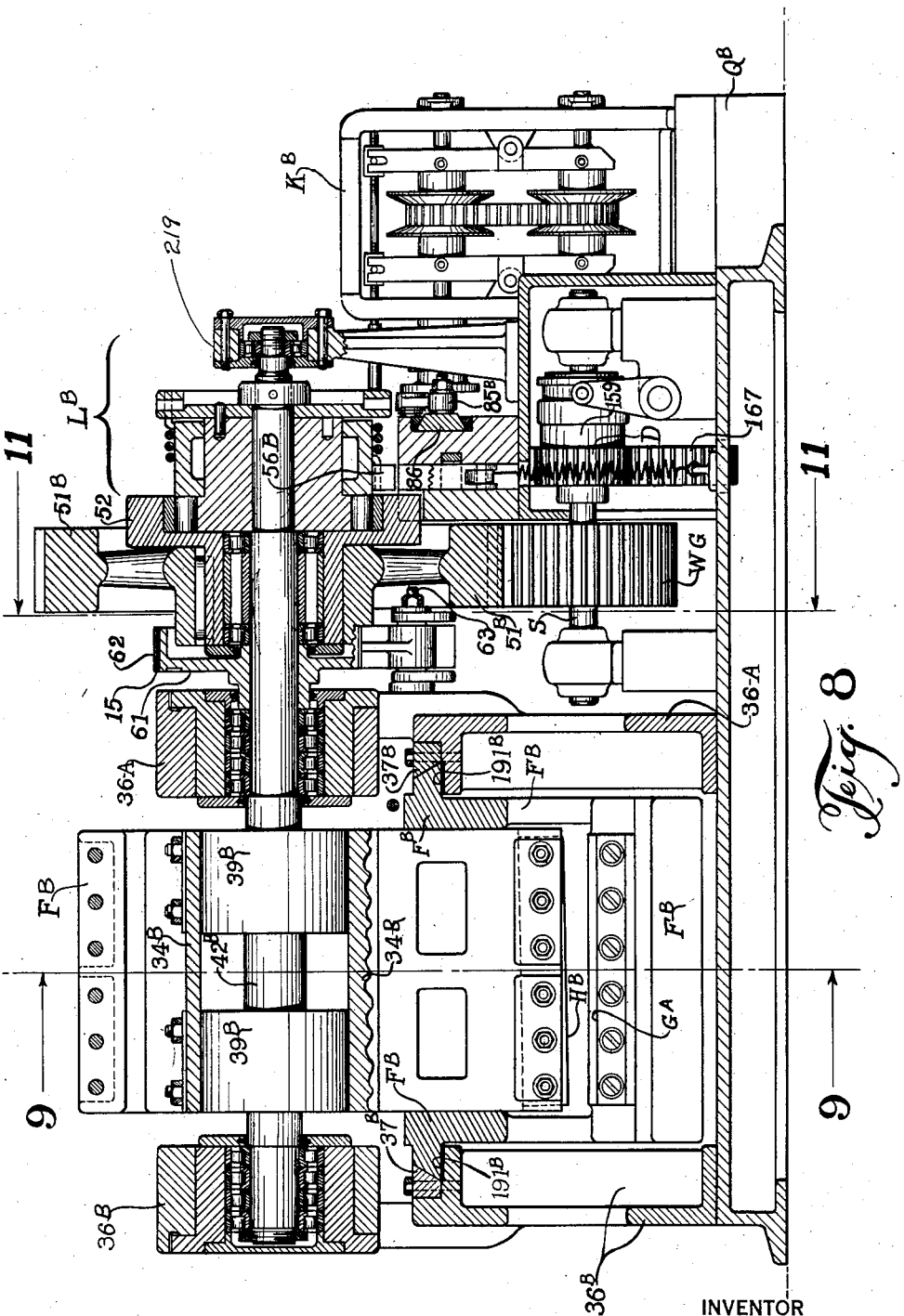

July 10, 1934.  J. H. ROBERTS  1,965,808
FABRICATING MACHINE FOR LONG STOCK
Filed Oct. 31, 1929  10 Sheets-Sheet 7

INVENTOR
Joseph H. Roberts.
BY
Philip Farnsworth
ATTORNEY

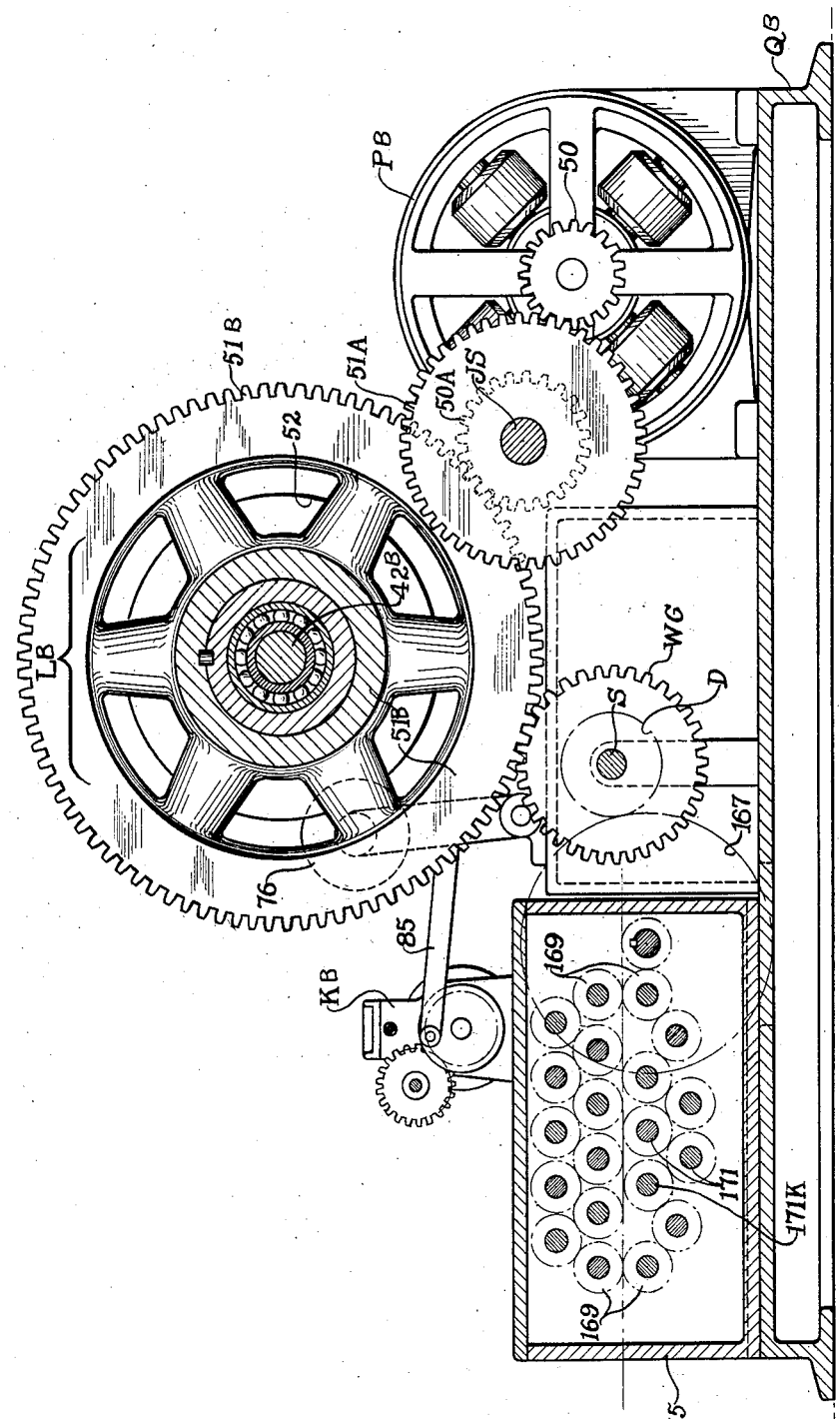

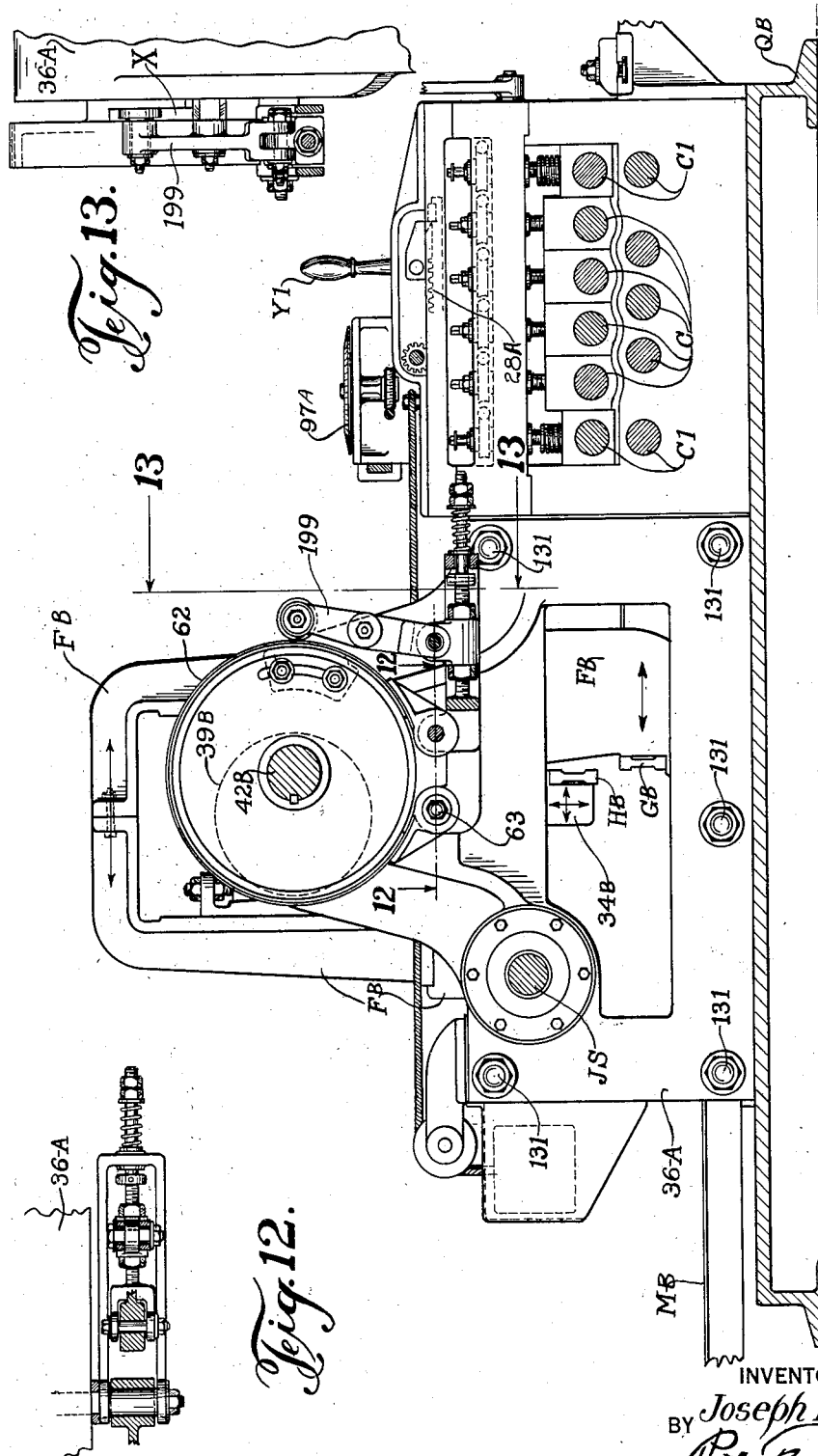

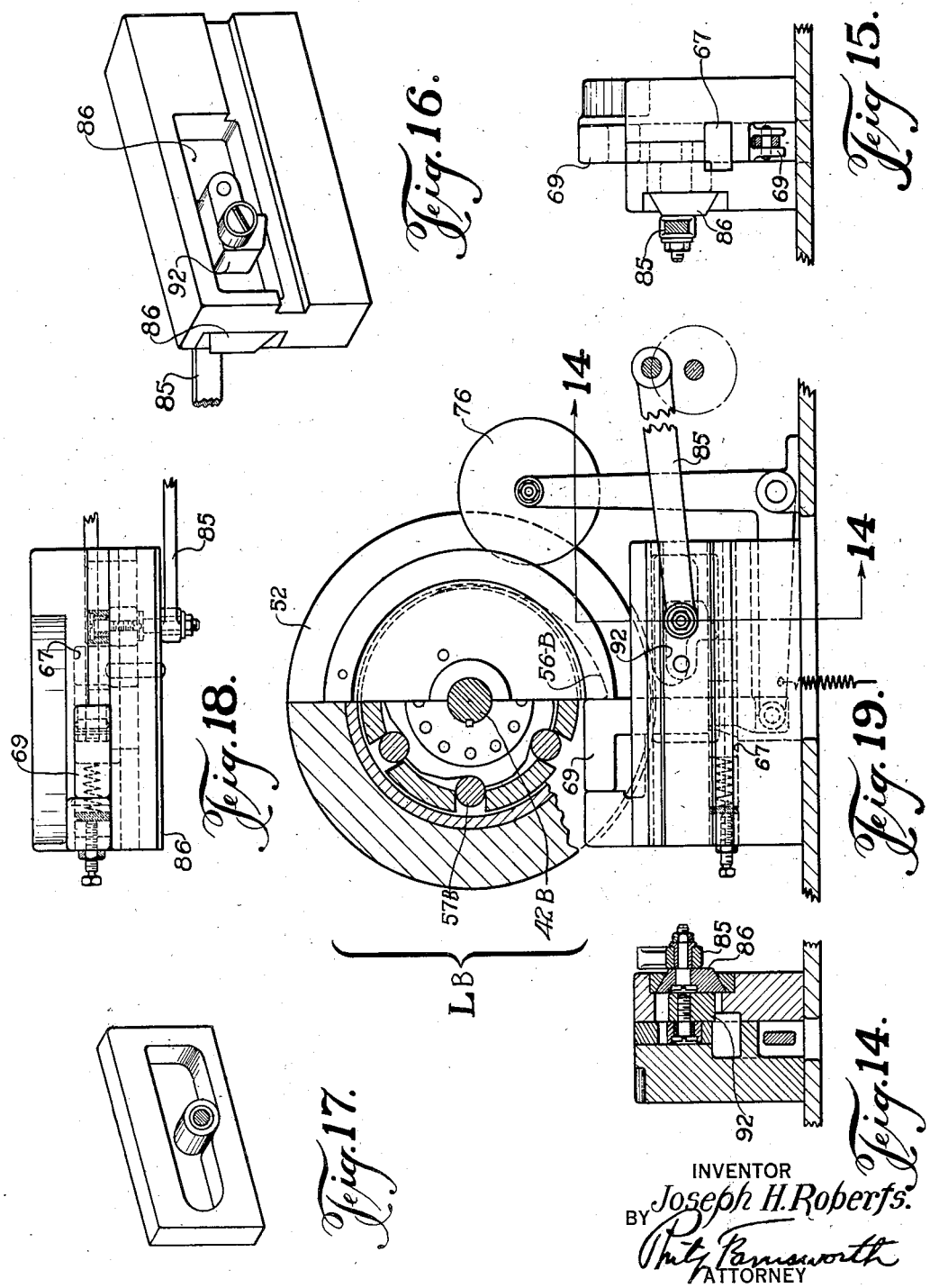

Patented July 10, 1934

1,965,808

UNITED STATES PATENT OFFICE

1,965,808

FABRICATING MACHINE FOR LONG STOCK

Joseph H. Roberts, Waterbury, Conn., assignor to The F. B. Shuster Company, New Haven, Conn., a corporation of Connecticut Application October 31, 1929, Serial No. 403,716

33 Claims. (Cl. 164—49)

This invention relates to machines for treating long relatively narrow steel stock, particularly in long strips of various widths, and for shearing the same into relatively short uniform lengths, and particularly machines of the general type disclosed, wherein the long relatively narrow stock whether steel rods or narrow or wide strips is fed to the shearing tools by means which straighten the stock as part of the process of producing sheared sub-length of uniform lengths.

The long metal rod or strip to be operated usually is coiled in single mill-production lengths of hundreds of feet, and when in strip-form having widths of a minimum of a foot more or less up to four feet or more, and thicknesses of the order of one quarter inch more or less; and by these machines advanced portions of such a strip, after being straightened, are sheared off to produce sub-lengths averaging twelve feet or more, but permissibly considerably less and considerably more, up to even twenty feet.

The machines hereof pertain to that special type wherein the shearing mechanism as a whole makes linear excursions along the horizontal path of continuous stock-feed over distances of only a few inches for the production of each sheared sub-length of a plurality of feet, such excursions being intermittent and the mechanism being normally at rest during the greater portion of the time of continuous stock-feed and operation of the machine as a whole. And a general characteristic of the type is that mechanism is provided whereby with an adjustment of a single permanent member, the machine can produce at different times, sub-lengths which may in length from a very few feet up to twenty or more; while at all times the length of travel of the intermittent shearing mechanism is the same, i. e., very short a few inches as compared with the greater lengths of the sheared sub-lengths whether they be only a few feet and twenty or more in length. In connection with such intermittent short travel of the shearing mechanism over constant distances for all the possible adjustments for the production of different lengths of sub-lengths, there is herein provided mechanism whereby each excursion or cycle of travel of the shearing mechanism produces straight sub-lengths of practically exactly the same length, until and unless the adjustment is made to cause production of longer or shorter sub-lengths all of the same length.

The object and nature of the invention is a machine of the above type wherein the arrangement of the shearing mechanism and its drive is conveniently compact, simple, and of low mass, yet strong and powerful enough to shear heavy long steel stock into sub-lengths, such mass being low enough to permit a high rate of operation and production, and to permit of control with such accuracy as to produce sub-lengths of stock actually of uniform lengths of any desired length as determined by a single permanent but adjustable master-control; and such machine including a clutch capable of such accurate control to produce such uniform sub-lengths at such high production rate without undue stresses on the clutch by the high stresses of the intermittent shearing operations on the steel stock.

Of the drawings, Fig. 1 is a vertical longitudinal section of one embodiment of the invention;

Fig. 4 is a front elevation of another embodiment and

Figs. 5–19 show a third embodiment;

Figs. 2 and 3 show features common to all these forms;

Figure 9:
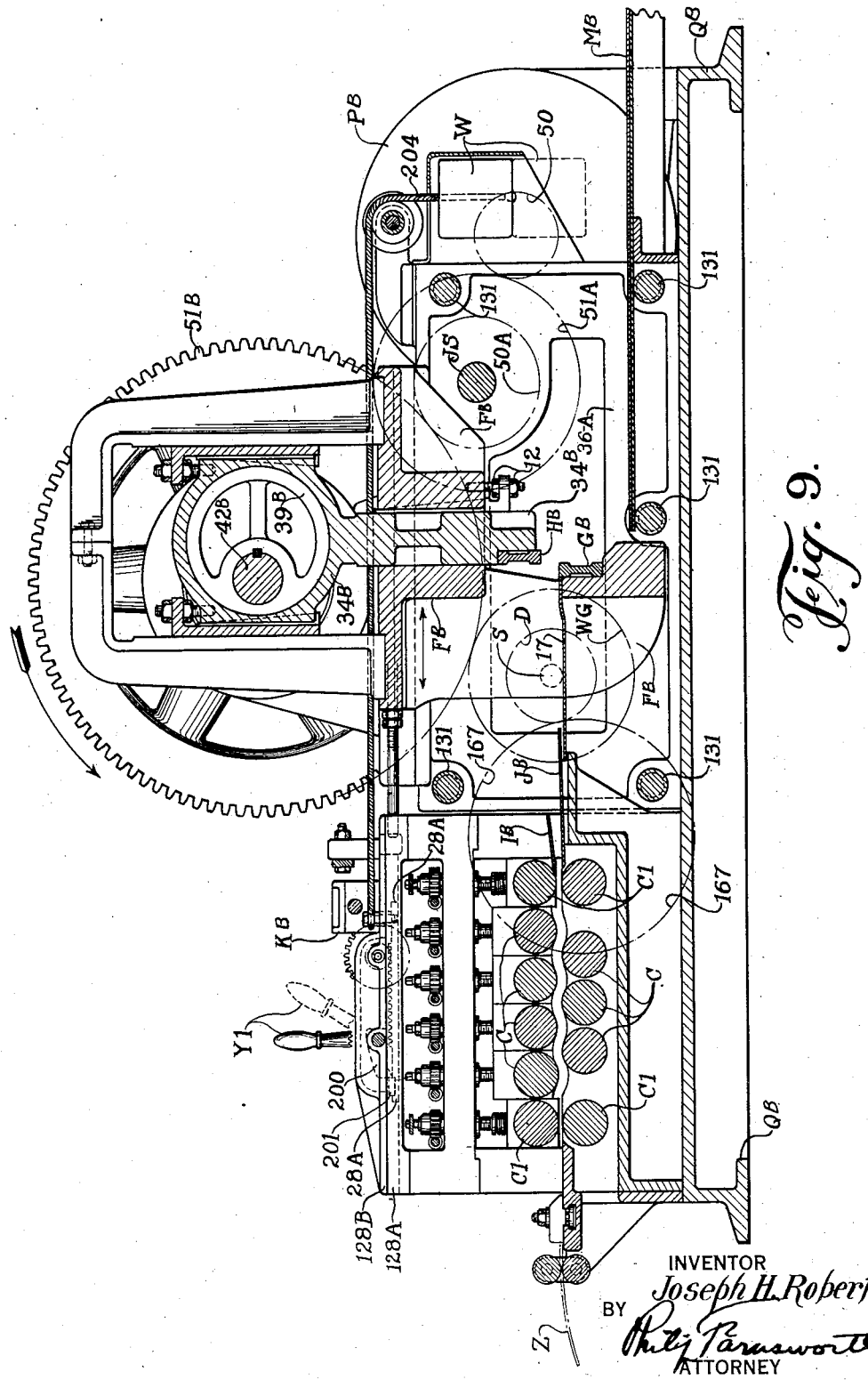

Fig. 2 illustrating the arrangement of inclined or raked shear-blade of all these forms;

Fig. 3 being a diagram of the operation of all these forms; and

Of the third modification of Figs. 5–19,

Fig. 5 is a front elevation; Fig. 6 is a rear elevation; Fig. 7 is an end elevation of the left of Fig. 5; Fig. 8 is a vertical transverse section at 8—8 of Figs. 5–6; Fig. 9 is a vertical longitudinal section at 9—9 of Fig. 7–8; Fig. 10 is a vertical longitudinal section at 10—10 of Fig. 7; Fig. 11 is a vertical longitudinal section substantially on line 11—11 of Fig. 8; Fig. 12 is a plan partly in section at 12—12 Fig. 11; Fig. 13 is an end elevation partly in section, of the braking apparatus of Figs. 11–12; Fig. 14 is a vertical transverse section on 14—14 of Fig. 19 which is a partial rear elevation partly in section showing the roll-locking clutch and the clutch-tripping mechanism; Fig. 14 showing parts of the latter; Fig. 15 is a right end elevation of the tripping mechanism shown in Figs. 14 and 19; Fig. 16 is a perspective showing parts of the same tripping mechanism; Fig. 17 is another perspective of the same tripping mechanism; and Fig. 18 is a plan of the tripping mechanism.

Fig. 1, showing the first machine, is a vertical section showing the steel or other metal strip Z which in the case of all three machines shown is, for example, about two feet wide and about one quarter inch thick and usually hundreds of feet long in a coil; Fig. 1 showing such strip extending from left (from a reel-box not shown) preparatory to being fed rightwardly thru the "roll-stand" at left (feed-rolls $C^1$ and feeding and straightening rolls C) to the shearing apparatus at right including the two shearing-blades G and H which are shown in Fig. 1 in their normal positions of rest as in diagrammatic Fig. 3, below and above stock Z.

Fig. 2 is a vertical section at 2—2, Fig. 1, showing the two shearing-blades G and H and particularly the latter which is mounted so that its lower or shearing edge is inclined upward from left to right, i. e., raked, (in a direction transversely of the machine) to cause the shearing load of the shearing cut to be distributed in duration by being applied gradually across the width of the strip so as to help to reduce the initial shearing load on the shear-operating clutch and reduce the instantaneous shearing-load at all stages of the transverse shearing operation. This Fig. 2 also shows generally the raked blades of the other two modifications. This raked blade is the ordinary one of prior non-traveling shearing machines for steel stock, and certain aspects of the invention hereof relate to the solution of the problem of using such raked blade with a traveling shear of the type hereof.

Fig. 3 is a diagram indicating by the arrows the shearing operation of the three machines hereof; the small horizontal arrows on blades G and H indicating the intermittent but simultaneous horizontal movements of the two blades, the small vertical arrows on raked blade H indicating its simultaneous vertical movement, all the arrows on blade H indicating its movement of revolution; the arrow on stock Z indicating the continuous rightward feeding movement thereof; the position of eccentric or offset 39 being its normal position of rest preferably at three o'clock with reference to eccentric-shaft 42 and with reference to the illustrated normal positions of rest of blades G and H; and the curved arrow indicating the anti-clockwise movement of a single rotation which is imparted intermittently to eccentric 39 and thence to blades G and H by the clutch L to be described and shown in detail in Figs. 7, 8, 10 and 18. This anti-clockwise movement of offset 39 is the movement as viewed by the operator facing the front of a machine, Figs. 1, or 4 or 5.

As shown in said figures, the two tools G and H are provided with carriers F and 34 respectively, and offset 39 is connected to carrier 34 so that when offset 39 intermittently is given a single complete revolution, it imparts a similar revolution to carrier 34.

Also the two carriers 34 and F are so combined with one another and carrier F is so mounted on the machine frame, as shown, that the successive intermittent revolutions of carrier 34 by offset 39 and clutch L cause horizontal reciprocations of carrier F, the sole and exclusive power connection to carrier F being by way of its sliding relation with carrier 34. Normally, Fig. 3, offset 39 is at rest at three o'clock relative to its shaft 42. Both tools G and H are moved forwardly in the direction of stock-feed by the anti-clockwise half revolution of 39 from 9 to 3 o'clock. From 9 to 6 o'clock, 39 revolves tool H down toward tool G and stock Z. During that quarter-cycle of tool H it is moving both in the same direction (rightward) as the stock and toward the stock; and the arrangement, as shown, is such that, altho tool G always is moved by 39 horizontally along the stock-path over the same distance as is tool H, yet, depending on the adjustment for desired sub-length, offset 39 in its successive intermittent revolutions, moves tool G horizontally along the stock to a shearing position which causes uniform sub-lengths because at that instant at a portion of said quarter-cycle of tool H between 9 and 6 o'clock when tool G has been moved to said shearing position, tool H itself is being revolved by offset 39 down across tool G and the stock for shearing of the latter. The point of the revolution of tool H when it so passes down along G and across the stock is between 8 and 7 o'clock, and approximately midway between 9 and 6 o'clock, i. e., at about 7.30.

The intermittent horizontal movements of carrier F are dependent on the intermittent revolution of carrier 34, are short relative to sheared sub-lengths, and are caused by the intermittent revolutions of carrier 34 by offset 39, in the following manner. Carrier F is slidingly mounted on ways 191 on the machine frame Q, for sliding back and forth along the stock-path. Also as shown, carriers F and 34 are mounted in mutual intersliding relation with one another. No power connection is provided for carrier F save its said intersliding relation with carrier 34. Carrier F, by its free horizontal sliding relation to the machine frame, is always ready for its excursion, so that notwithstanding its intersliding relation with carrier 34, it offers no barrier to the revolution of the latter when, intermittently, carrier 34 is revolved by offset 39; and since carrier 34 is free to slide vertically in carrier F, and carrier F as above always is free to slide horizontally relative to the machine frame, the intermittent revolutions of carrier 34 cause intermittent horizontal reciprocations of carrier F. The length of horizontal travel of carrier F along the stock-path is the same as the diameter of the circle of intermittent revolutions of carrier 34; but said diameter and said length of travel are not related to the length of sheared sub-lengths, the latter being determined by the permanent adjustable mechanism to be described, which in turn is independent of offset 39. The latter is in permanent relation with its shaft 42 in the position indicated by the spline or key. As shown, Fig. 3 the normal position of rest of offset 39 is at three o'clock. At each successive operation, offset 39 is given one complete revolution, returning to rest at three o'clock. Since as above, the shearing between tools G and H is effected at about seven o'clock, the offset 39 must start from a position of rest above the stock line, as shown, i. e., when carriers F and 34 are in their extreme rightward or forward positions relative to the rightward direction of stock-feed, with carrier F in position for leftward movement by carrier 34 in a direction opposite to stock-movement. In constructing the machine, the carrier F is placed in such position shown, at extreme right, before eccentric 39 is keyed to its shaft 42 in the three o'clock position of eccentric 39 shown. This is when shaft 42 is in its normal position of rest, in correspondence with the normal position of rest of the clutch-parts to be described, i. e., when the entire shear-operating mechanism is stationary,—in fact, during construction, when the driving motor may not be connected to the machine at all. When carriers F and 34 and offset 39 are in said positions shown, the key is driven between shaft 42 and offset 39, and this constitutes the permanent relations of those parts, even on all occasions of different adjustments of the machine for shearing uniform sub-lengths of different length for different positions of the adjusting device to be described. Thus carrier 34 always has the same diameter of circle of revolution, and always drives its mate, carrier F over the same distance horizontally which is short relative to any of the various lengths of sub-lengths for different positions of the adjusting device 65.

Thus, at the start of each intermittent cycle of the shearing mechanism, offset 39 moves up from three o'clock, thereby starting carrier 34 and tool H not only upwardly, but rearwardly, i. e., leftward, in the direction opposite to stock movement; and carrier F, and its tool G also are moved leftwardly, exclusively by the revolution of carrier 34. And as carrier 34 passes nine o'clock, it causes reversal of direction of motion of carrier F and its tool G, so that, as above, during the quarter-cycle of revolution of carrier 34 between 9 and 6 o'clock, its tool H is moved toward and across the stock and rightwardly in the direction of continuous stock-feed, while carrier 34 itself is causing movement of carrier F and its tool G in the same direction, i. e., rightwardly, that of stock-feed.

The remarkable thing about this construction and operation, involving the intermittent drive of carrier F horizontally, exclusively by the revolution of carrier 34, is that altho the facts above are correct, carrier F and its tool G being reciprocated intermittently by the revolutions of carrier 34 always over the same horizontal distance for all different adjustments by wheel 65 for different sub-lengths, nevertheless the actual almost instantaneous shearing operation itself occurs, for any and all such adjustments, always at the instant, about seven-thirty o'clock of each intermittent revolution of carrier 34, when both tools G and H carried respectively by carriers F and 34 are moving horizontally in the same direction and at the same rate as stock Z, and after the desired amount of stock to be sheared off, has been straightened and fed horizontally between tools H and G.

Since the reciprocations of carrier F are caused exclusively by the revolutions of carrier 34, and since the rate of movement of carrier 34, horizontally along the stock-path, is varying constantly on account of its revolutionary movement, and since therefore the rate of horizontal rectilinear movement of carrier F along the stock-path also is varying constantly throughout each of its intermittent angles, there is only a very short time indeed during such short and rapid and rapidly varying horizontal movements, at each intermittent cycle, when such constantly varying rate is the same as that of the rate of stock-feed. But during such extremely short time, it is absolutely necessary, not only that carrier 34 shall, during its forcing forward of carrier F, carry revolving tool H down across tool G and stock Z, to shear off the van end of the stock, but that said carrier 34 shall carry its tool H up and out of the path of steel strip Z before the constantly varying rate of revolving carrier 34 may cause the rate of horizontal movement of revolving tool H to be lower than the stock-rate.

Such accurately timed operations are provided in the three machine modifications hereof, notwithstanding that the entire construction and operation are characterized by the revolution of carrier 34 by an offset 39, so that regardless of carrier F, carrier 34 is revolved intermittently by offset 39, altho carrier F is so slidingly related to both the machine frame and carrier 34 that carrier F is intermittently reciprocated exclusively by the intermittent revolutions of carrier 34.

The modification of Figs. 5-11 is the preferred form, and the remaining description will be directed largely to that and to the associated parts of Figs. 12-19, it being understood that said parts of Figs. 12-19 may be employed in connection with the modifications of Figs. 1 and 4, and that all these machines are alike in certain relations of the shearing mechanism to the transversely inclined or raked revolved blade H of Figs. 1, 2, 4 and 5-11, the intermittently revolved carrier 34 for which blade H in any case constituting the sole means for reciprocating carrier F and its cooperating blade G, in a machine adapted to shear long steel strip stock.

Heretofore it has not been found possible to employ an arrangement such as directly intersliding carriers F and 34 (wherein the latter is revolved intermittently by an offset and carrier F correspondingly reciprocated exclusively by said revolution), for the purpose of operating a raked blade for shearing steel strip stock. Heretofore the length of horizontal travel of the tools has been made as short as possible (as short as three inches) in order to provide the fullest possible advantages of the intermittently actuated short-stroke shearing mechanism and short throw offset such as 39, all adapted for cooperation with a readily adjustable sub-length predetermining device, as distinguished from the type of shearing mechanism which reciprocates over relatively great distances as long as the sheared sub-length. Such extremely short strokes are permitted by the inherent nature of the intermittently operated shearing mechanism.

The problem was this. When such desirably short diameters, such as a three inch diameter of revolution of a revolving carrier such as 34, for example, was provided with an offset as 39 which had the throw of one and one half inches appropriate to cause such desirably short movements of the carriers along the stock-path, then the duration of the time of passage of raked blade H vertically over a sufficient distance down and up along tool G and across the stock-path, (i. e., a distance sufficiently long to cause the entire vertically inclined edge of blade H to cut across and thru the entire horizontal width of the stock, was so long a duration of time that before the shear-cut was completed by the downward movement of raked blade H, the revolving power-master, carrier 34 for raked blade H, would revolve the latter in the direction of stock-feed so far toward six o'clock, of the anti-clockwise revolution of carrier 34, that the rate of movement of blade H in the direction of stock-feed would be increased by its revolution by its carrier 34, substantially above the rate of stock-feed, this condition being plainly impracticable, for it is clear that the shear-cut must be completed before the horizontal rate of blade H exceeds the rate of the horizontally moving stock. I solved this problem first by a construction which did not permit the direct intersliding relations of carriers F and 34, but which included a second offset mechanism, etc., which caused raked blade H to move vertically so much faster vertically than horizontally that it completed the shearing operation by the raked blade H before the horizontal rate of said blade became higher than the rate of horizontal stock-feed. But that first solution, while perfectly operative, was not satisfactory, not only on account of its higher cost, but because it involved the addition of parts cooperating with the second offset or eccentric which added very undesirably to the weight of the intermittently, abruptly and rapidly moved shearing mechanism and its driving means. A feature of the present invention is a solution of the problem by a simplified construction which provides a light-weight combination of cooperating carriers F and 34 and offset 39 but which also is adapted to the timely operation of the raked blade for shearing steel-strip stock, this solution permitting the illustrated and above described combination with such a raked blade for strip-shearing, of the direct intersliding relation of carriers F and 34 and the direct revolutionary drive of carrier 34 by offset 39 whereby the latter causes reciprocation of carrier F exclusively by the revolution of carrier 34; and this simplified alternative solution of the above problem being based on the simple consideration of providing a throw of eccentric 39 which is not too great to extend unduly the extent of horizontal travel of the two tools G and H but which is sufficiently great to move raked blade H down and up at a rate sufficiently high to enable it to complete the shearing cut before it is moved by revolving carrier 34 in the direction of horizontal stock-feed at a rate higher than the continuous stock-movement. This solution of the problem possesses several additional advantages to be described, and involving the discovery by me of the potentialities of the offset 39 in its illustrated general combination with carriers F and 34, in respect to comparatively slight throws of offset 39, in their effect, in various machines, on the rate of production, and the very important matter of the rate of clutch L consistent with a not too short operative life thereof. But in any case, in a given individual machine, there is nothing adjustable about the offset 39 during service, and its throw and its disposition angularly with respect to shaft 42 remain fixed after having once been established in construction.

The following is an illustrative example of one embodiment of the above principle of the invention in a strip-shearing machine including a blade H having the desirable raked edge, as heretofore in non-traveling shears. It is to be remembered that this includes the above relations of carrier F of which the directions and rates of movement are dependent wholly on the revolutions of carrier 34 and that the rate of revolution of the latter by 39 along the stock-path varies continuously throughout each intermittent cycle so that the rate of horizontal motion of carrier F also varies continuously so that the time is very short indeed when tool H can be in contact with stock Z. Assuming dimensions of a raked blade as commonly used heretofore in machines of other types including a blade-edge longer than the width of the strip (or series of steel rods in one plane), and the shearing angle of the edge, the latter suitable for shearing steel stock of a given thickness of say a quarter-inch, such a blade may have a shearing angle of about three-quarters inch per foot of length of blade-edge. Assume also that the blade-edge has a length of twenty-five inches for shearing a steel strip two feet wide, so that the rake is twenty-five thirty-seconds inch for the shearing angle of three-quarters inch per foot of blade-edge. I have found that pursuant to the above principle of the invention the throw of the cooperating eccentrics 38, 39 of Fig. 1, in the present example, need be only doubled (relative to the above example of one and one-half inches), so that a three-inch eccentric-throw, in the disclosed combination of tool-carriers and eccentric or offset device, will provide a six-inch diameter of circular revolution of carrier 34, with a six inch vertical movement, and that such diameter of revolution will permit the employment of the desirably raked blade in a combination practically operative to compel completion of shearing before the horizontal rate of the raked blade (advancing anti-clockwise toward six o'clock) begins to exceed the rate of horizontal stock feed. (It will be understood that, provided that the shear-cut has been completed by the raked blade, then the subsequent increase of horizontal rate of the blade above the rate of stock-feed, as it approaches six o'clock and thereafter begins to move up, is useful, prior to the raising of the entire inclined edge of the blade up out of the stock-path, in insuring that the continuously advancing stock shall not abut against the blade in its path at a higher rate than the blades.) As another example, but employing the above three-inch throw of offset 39, by way of example only, with the illustrated combination of carriers 34 and F, a steel strip one foot wider (i. e., three feet wide), can be duly sheared with the use of a raked blade having a thirty-seven inch edge and the same shearing angle of one and three-quarter inches, but a somewhat greater rake than the above twenty-five thirty-seconds of an inch. Thus, without going into the matter of reasons and details of designs by the designer of a particular machine, it is plain that without unduly increasing the length of horizontal travel of the carriers 34 and F, it is practicable to combine the illustrated arrangement of those carriers with a desirably effective raked blade, in accordance with the principles of the invention, so that the blade-edge will not be forced broadside rightward at higher rate against the rear (left) end of the sub-length being sheared, during the passage of the blade across the moving strip for shearing, that all this applies to all successive transverse portions of raked blade H, and that the shearing operation of a strip by a raked blade in the illustrated arrangement of eccentric 39 and carriers 34 and F, for the first time is limited to a direct, clean shearing cut across the stock alongside blade or tool G in carrier F reciprocated by carrier 34 revolved by offset 39. It is clear that said mere doubling of the throw of offset 39, without any other change of the relations of parts F, 34 and 39, results, by the consequent doubling of the diameter of the circle of revolution of carrier 34 and a consequent doubling of the extent of vertical movement and therefore rate of raked blade H, from say about three to about seven inches, in the desired object of so rapidly increasing the vertical rate of blade H that it can and does complete its raking shearing action before its horizontal rate can exceed the rate of the horizontally advancing stock. Thus, as above, as a fundamental principle applicable to the designs of various machines for different cross-sections of stock, etc., slight differences in the throw of eccentric 39 not only make it practicable to provide an operative strip-shearing machine employing a raked blade H of any desired proportions, but make it possible and practicable in the first place, to employ a raked blade for shearing strip stock in this travelling shear.

But the machine hereof involves further advantageous combinations of elements including the control-feature, in machines of different designs, of throws of the offset 39, of the order of several inches, all as will be described in connection with remaining elements of the preferred machine of Figs. 5–11.

Referring to the construction of Fig. 1 in cooperation with the above elements, the rolls C, C1 of the roll-stand force strip Z rightward to, between and beyond blades G, H carried by F and 34. Each of such rolls is driven positively by connections 150, Fig. 7, from the main driver or motor, as P in Figs. 4–6, at rates coordinated with means, as gears 44–46, Fig. 1, driving carriers F, 34, the gears in turn being driven intermittently by roll-locking clutch L, Figs. 4, 6, 7, 8 and 10, by way of gear 50, and heavy fly-wheel gear 51 normally idle on shaft 42C, the parts being held normally at rest by brake members 61–62, Fig. 8, and the engagement of the two stop-noses 56B, Fig. 4, against stop 69 being intermittently withdrawn to trip the two-station clutch successively by adjustable continuously operating master K, such as the standard Reeves transmission shown, Fig. 7 this master being adjusted at will by wheel 65 relative to dial 97 to predetermine the desired uniform length of all the stock sub-lengths sheared at a given setting of said master control K at 65. Thus the simple adjustment for sub-lengths is provided independently of offsets 39, carriers F, 34 and the eccentric shafts 40, 42.

In Fig. 1, the gears 44–46 as a speed step-up, and two noses 56B, (see Fig. 4) cause one revolution of carrier 34 and tool H for each half-revolution of the two-station clutch as L, Fig. 4 and LB, Fig. 19. The roll-stand for rolls C, C1 and carriers F, 34 are mounted on frame Q, 36, 36A, shafts 40, 42C and 42 being journalled in members 36, 36A on frame Q, and carrier F traveling on ways 191 on 36, 36A. Strip Z is guided and supported by parts J, 17 in its rightward feed, and its van extends over receiving table M, and upon shearing, drops on the latter. Offsets 39 are located below the stock-path.

In Fig. 4, an improvement on Fig. 1, is a single offset shaft 42A, resulting in omission of Fig. 1 braces 34B for carrier 34, and of the entire "eyeglass" construction including second shaft 40 and its eccentrics 38, leaving only single shaft 42A, Fig. 4, below the path of stock Z. Also, in Fig. 4, carrier FA has a downwardly extending portion in which carrier 34A is mounted so that substantially all the intersliding of the carriers by which the reciprocation of carrier FA is dependent upon the revolution of carrier 34A by the small offsets 39A, is provided well below the stock-path. Bronze wedges 209 centralize carrier 34A in carrier FA. In Fig. 4, notwithstanding that carrier 34A is the exclusive power connection to carrier FA, nevertheless the above arrangement is such that it results in the advantageously lighter mass of carrier 34A which is the element which intermittently is started abruptly from rest. Altho this lighter construction of carrier 34A is obtained at the expense of a heavier construction of carrier FA due to the downward extension of the latter to receive carrier 34A, that is not disadvantageous, because the intersliding relation between the two carriers causes the intermittent starts (and stops) of reciprocating carrier FA by revolving carrier 34A, to be gradually in harmonic motion, that is, as gradually as is practicable in the fundamental compact arrangement hereof, wherein offsets 39 at most have the very short throw of only a few (several) inches, while the horizontal rate of carrier FA must be brought up to the stock rate, for shearing, within the time of the eccentric throw. Thus carrier FA, dependent on carrier 34A for its operation, does not of itself require braking action. This is important because of the many thousands of recurrences of the intermittent starts and stops. And the lighter combination of carrier 34A in Fig. 4 is important because thereby the shocks of the many starting loads on the necessarily more or less relatively delicate roll-locking clutch L, are very greatly reduced, and a much lower braking effect is required for the lighter but revolving and non-harmonically acting carrier 34A which is started abruptly and must be stopped promptly at the end of one revolution in order to insure uniformity of sheared sub-lengths of stock.

As shown, the adjustment 65 of stock-length master K, for pre-determination of desired lengths of sub-lengths, is effected readily and quickly by the mere turning of hand-wheel 65 pursuant to length-indications on dial 97. This is the only adjustment required to cause the machine to produce quite different uniform sub-lengths, the novel combination of parts 34A, 39A and FA having fixed relation of said parts for all different lengths of sub-lengths. The transmission between 65 and K and clutch-tripping mechanism 86, 92, 67 and 69 includes pitman-rod 85 Figs. 14–19. The mechanism indicated at the bottom of Figs. 1, 4 and 19 is that for re-latching the clutch L, by way of carrier 34A and wearing plate 75, after the operation of the above clutch-tripping mechanism.

In Fig. 4, clutch L is mounted on shaft 42C, separate from eccentric shaft 42A.

The wedging rolls 57 of this clutch and their cooperation with the other elements of Fig. 19 and with the above novel combination of shear-parts 34A, FA and eccentric or cam 39A, and the above tripping and re-latching mechanism, are the means for insuring uniformity of length of successive sub-lengths of stock which are sheared for any given adjustment of hand-wheel 65 controlling length-master K. The arrangement of parts 65 and K and positively-acting wedge-locking rollers 57 is such that the clutch is tripped and relatched throughout all the successive shearing operations for dividing the entire roll of long narrow stock into sub-lengths. The travel of clutch rollers 57 always is the same distance for each successive clutch-operation; and the high speed of operation of these rollers or some equivalent means is necessary with the novel combination of parts FA, 34A and 39A of Fig. 4 in order to secure the start of revolution of 34A at that precise instant of the linear horizontal movement of carrier FA by the revolution of 34 which will insure that when HA on 34A is revolved by offset 39A down into contact with the stock, then the rate of FA will be the same as the stock. In the machines hereof including rolls 57 in combination, the successively sheared steel sub-lengths are almost absolutely uniform within a small fraction of an inch, a result which cannot possibly be obtained with an intermittent power connection dependent for its operation upon the normal action of slipping friction parts or intermeshed teeth.

In Figs. 5–11, the clutch L (LB), Fig. 6, is mounted directly on the eccentric shaft 42B, this being permitted by the above relations of the throw of offset 39B to the cooperating parts to be described further as to Figs. 5–11.

Other features of the construction of the third machine of Fig. 5–19 are as follows.

The slender shank or blade-carrying portion 150 of carrier 34B is formed with cored-out pockets as shown in Fig. 9, to reduce further the mass of this intermittently moved member having a non-harmonious starting and stopping motion. Said shank of 34B is of lighter weight also on account of the change of location of the stock passage window from carriers 34 and 34A in Figs. 1 and 4, to carrier FB in Fig. 5. This window in FB in Fig. 9 is shown clearly at the left of the space between tools GB and HB. This omission of said passage from carrier 34A in Fig. 4 yet permits and results in the yet further decrease in size and mass of carrier 34B in Fig. 9.

The single eccentric-shaft 42 supporting clutch LB is provided with out-board bearing 219 as shown in Fig. 8 at upper right.

The re-latching of the single-station clutch LB in this third machine is effected by having the single clutch-nose 56B, Fig. 19, make contact, (sometime during its single revolution previous to contact-making between 56B and stop 69), with a large roll 76, Figs. 6 and 19, mounted on a bell-crank arrangement of levers 77—78, the motion of 56B after contact with roll 76, Fig. 10, raising stop 69 to its proper position, and the stop 69 being locked in such position by detent 67.

The length master control KB, Figs. 8, etc. here is of the vertical type of variable speed transmission, adapted to the arrangement of the tripping mechanism for clutch LB on a high plane, and to the placing of the master at a high level so that its adjustment and the hand-tripping controls shown may pass over the top of the roll-stand to the operator's handles Y1 and 65 at the front of the machine at left, Fig. 5.

The structure of modified carrier FB for tool GB, Fig. 9, is of three castings, i. e., (1) the main reciprocating casting or sub-structure which is supported by the ways on side-frames 36—36A; and (parts 2 and 3) the two L-shaped members constituting the superstructure which embraces carrier 34B, by inversion and securing together of said L-shaped members by bolts at the top, Fig. 9, and by the securing of their outer ends or feet at bottom to the sub-structure or main body of FB involving lipping or setting down into the latter so as to transmit to it in a positive manner the horizontal thrusts imparted by the horizontal part of the revolution of carrier 34B caused by the offset or cam 39B.

Intermittently revolved carrier 34B is shown in general, Fig. 9, as of an ordinary type of crosshead for steam engines, save that it encloses an eccentric (39B) which supports it, and itself is housed for sliding in carrier FB which is moved by the revolution of 34B in a direction at right angles to the direction of sliding of 34B in FB. In the shearing portion of the single cycle of offset 39B, the carrier 34B pushes tool HB down across and stock Z, while the portion of the stock at the left of the shear cut is confined against vertical movement, by the horizontal stock-passage or window thru the substructure of carrier FB.

The brake shown in Fig. 8, at 61—63, 15 etc., acts on eccentric-shaft 42B to stop the shear parts uniformly at the end of the single cycle of eccentric 39B, as at three o'clock, Fig. 3, or just after the above clutch-re-latching mechanism has caused de-wedging of locking rolls 57B Fig. 19. This is an intermittently acting brake which reduces wear of brake-lining 15 and drum 61, as compared with a brake continuously applied and operating thruout the entire eccentric cycle of all the intermittent shear-operations.

For his purpose there is provided, in addition to the brake-drum 61, brake-band 62, brake-lining 15, and band-adjusting means, a cam X secured to the drum 61, Fig. 13 so that the movement of the drum turns the cam to actuate the linkage 199 so as to operate the brake-band 62 during only that limited portion of the rotation of eccentric 39B and its shaft 42B which is needed to stop, as at three o'clock, the anti-clockwise rotation of carrier 34B; i. e., the brake is applied for only about 25° of the close of each of the successive cycles of eccentric 39B before the latter reaches its normal position of rest. At the end of each eccentric cycle, and owing to the inter-sliding of carriers 34B and FB, the harmonic stopping of heavier carrier FB cooperates with the above brake and with gravity in checking the upward movement of lighter carrier 34B and its driving eccentric and shaft, etc., and stopping it at three o'clock. Owing to the part-cycle action of said cam X and its linkage, this intermittent brake remains in active application also while the shearing mechanism is at rest, while the van of the stock Z is being advanced for the shearing of the next sub-length, and the brake also is kept applied for about 5° of the next intermittent cycle of eccentric-shaft 42B, in order to assure that eccentric 39B will not tend to swing by gravity down from its normal three o'clock horizontal starting position as shown; the whole constituting a total brake-engagement for only 30° of the complete circle, instead of for the entire 360°, with corresponding reduction of wear on brake-lining 15 and drum 61. It is sufficient that the brake shall insure, not merely that the revolutionary movement of carrier 34B shall be stopped promptly after the above re-latching of the clutch LA to discontinue the wedging action of rollers 57, but that such stoppage shall be at a location always the same distance from that portion of the revolution of carrier 34B (about 7.30) at which shearing is effected. For the purpose of production of actually uniform sub-lengths for which the machines hereof are practicable, the intermittently successive revolutions of carrier 34B on which the motions of carrier FB are dependent, must be started and stopped always at the same point of the revolution of carrier 34B; and in stopping 34B the brake is cooperative with the prompt, quick and accurately acting wedging rolls 57 and the above re-latching means therefor, so that offset 39B is disconnected from motor PB always at the same instant, in each successive cycle, after completion of shearing, just as, after the next operation of master K tripping clutch LB (locking the wedge-rollers 57), the offset 39B promptly, quickly and accurately starts the revolution of carrier 34B from the exact point of its revolution in which it previously was stopped by the combined operations of the brake and the above clutch-re-latching mechanism. That is, it is sufficient that the duration of effective action by the braking mechanism shall fill the time between tripping and re-latching operations controlling the relative positions of the wedging rollers 57. It is the combination of the braking mechanism with the wedging rolls which insures the timely shearing by the intermittent shear-operations so accurately as in fact to produce uniform sub-lengths, of a length pre-determined by the adjustment of wheel 65. The brake may be located on an extension of shaft 42B exposed to access by the operator at the front of the machine for brake-adjustment.

For clearness of description the following is noted. In the first machine of Fig. 1 there are two eccentric-shafts 40, 42 each carrying one or more eccentrics 38, 39 (which are duplicates as to length of throw), both said shafts being located below the stock-path; a third shaft 42C being provided for clutch L with speed step-up gearing 45, 44, 46 between the clutch shaft 42C and the eccentric shafts 40, 42. In the second machine of Fig. 4 a single eccentric-shaft 42A is located below the stock-path; a second shaft 42C being provided for clutch L likewise with speed step-up gearing between the clutch shaft 42C and the single eccentric-shaft 42A. And in the third machine of Figs. 5, etc. as shown in Fig. 9, there is provided a single eccentric-shaft 42B, and the clutch LB is mounted directly on said shaft, but the shaft is located above the stock-path as distinguished from Figs. 1 and 4. The stock-path in Figs. 1 and 4 is upwards of four feet above the floor, but in Fig. 5 it may be only half as high, i. e., as low as twenty inches or even less, as the result of the above described new construction and relation of the tool carriers FB and 34B in Fig. 5. In Figs. 1 and 4 the bed-plate Q is about eight inches high, but in Fig. 5 it is higher, and the stock-path desirably lower, for the following reasons. In Figs. 1 and 4 the side frames 36—36A extend the entire length of the machine to support both the roll-stand at left and the horizontally traveling shear carriers at center. In Fig. 5, the stock-path is so low that the roll-stand and its gear-box 155 Fig. 10, are set directly on the bed-plate QB, the side-frames extending under only the shear parts to support the latter, and therefore being higher than when required to support the roll-stand also. The bed-plate QB at left in Fig. 5 is made higher than in Figs. 1 and 4 when it is desired to have the stock-path higher than its usual minimum of twenty inches, the increase in vertical height of frame QB corresponding with the increased height of stock-path described above, say twenty inches; the roll-stand set on frame QB determining the height of the stock-path.

In Figs. 1 and 4 the transverse supports of the machine for cooperation with the side-frames 36—36A are metal plates or castings, but in Fig. 5 they are in the form of tie-rods or bars 131, (five as shown), connecting said side-frames 36—36A Fig. 11, and spacing them apart, said bars themselves being spaced apart from one another vertically as shown, in order to permit the feed of the stock Z which here is along a horizontal plane or line intermediate the top and bottom of the machine, i. e., intermediate the upper and lower of the transverse rods or bars 131. This skeleton construction of transverse supports also increases visibility of the tool-operations upon the stock thru the front window in front side-plate 36A, Fig. 5.

The gibs 37B, Fig. 8, left and center, analogous to 37, 37A of Figs. 1 and 4, retain carrier FB in sliding engagement with side-frames 36—36A in ways 191B formed by said gibs and by integral projections from said side frames. These gibs 37B preferably are of the so-called V-type as shown so as to be accommodated to the lack of space transversely; altho the alternative flat-surfaced type of gibs may be employed by adding to the width of the machine to accommodate such wider gibs.

In Fig. 7, upper right, is shown one of the ribs for reinforcing the upper part of the frames 36—36A where the latter support eccentric shaft 42B.

In Fig. 8, is shown, upper right, the out-board bearing 219 for the rear end of eccentric-shaft 42B carrying the overhanging load of heavy flywheel gear 51B and the clutch LB; and at the upper left and middle is shown the special roller bearing mounting of the front end of said shaft in side frames 36, 36A. Eccentric shaft 42B is of the order of five and one-half inches diameter; and eccentric 39B (two on the same shaft for very wide strips) is fifteen inches in diameter by ten inches face, and with three and three quarter inches throw in accord with features of the invention to be described of the third exemplary machine.

At 12, right, of Fig. 7 is a handle to operate friction clutch 159 of Fig. 8, to stop the feed rolls of the roll-stand when desired to stop the stock-feed and straightening without stopping the entire machine; and at 65 is the operator's hand-wheel for adjusting master KB to the desired sub-lengths as indicated by dial 97B.

The super-structure of the roll-stand is shown at 128A, 128B at Fig. 6, upper right, supporting the several members of the hand-trip mechanism including 27A, 28A, 200 and 201, etc.

Motor PB in Figs. 5–11 is of variable speed because of the desirability of operating the machine at a lower rate of all the moving parts, as when adjusted at 65 to produce the shorter sub-lengths of only a few feet from the long stock. Such lower rate of operation then is desirable in order to avoid excessive frequency of clutch-operation involved in producing such shorter sub-lengths of minimum footage at the otherwise desirably high rate of stock-feed. Such lower frequency of clutch-operation for shorter sub-lengths, altho undesirably decreasing the rate of footage production, has the useful effect of usefully preventing excessive wear on the roll-locking clutch LB which at best is a comparatively delicate mechanism. But when producing the longer sub-lengths and usually, it is desirable to increase production by speeding up the motor and thereby more fully utilizing the advantage of the feature of the invention involving higher order of several inches of short eccentric throw now to be described in connection with Fig. 5. The machine of Figs. 5, etc. is designed for a maximum sub-length of sixteen feet and a minimum of three feet, so that in this particular case the permissible range of sub-lengths in feet has a little higher maximum and minimum in feet than the usual range of several inches of permissive throw of eccentric 39B in inches, altho both are of the same general order of magnitude of units, the one in feet and the other in inches.

Rolls C, C1, Fig. 10, are on substantially the same gear-spindles 171, 171K supporting small gears 169, i. e., on the two mid-horizontal rows of gear spindles. Spindle 171K, Fig. 10, is extended rearwardly to drive length-master K via suitable gear reductions.

In Figs. 5 and 7 is shown the superstructure casting 127A on top of the roll-stand member 127, said casting supporting the adjustment for master K including the dial indicator 97, and the manual control Y1 for the mechanism for tripping clutch LB manually at will. In Fig. 9, W is a weight suspended from cable 204 and actuating rack 28A when released by handle Y1.

In this third machine, the transmission between motor PB and the rolls of the roll-stand at left, Fig. 10, includes gears 50, 51A, 50A and the large bull-gear 51B on the loose hub 52 of clutch LB, said bull-gear 51B engaging a smaller gear WG on shaft S; this transmission also including gears D and 167, the latter driving the smaller gears 169 etc., inside the oil-tight gear box 155 to drive the rolls C, C1 positively. It is this transmission between bull-gear or fly-wheel 51B which imparts the higher feed-rate to the feed rolls, to correspond with the throw of eccentric 39B. The transmission from motor PB is via fly-wheel i. e. heavy gear 51B to the feed-rolls as above, and also to eccentric 39B and the tool-carriers, so that, on account of the relatively low transmission ratio between the motor and the eccentric via jack shaft JS by which the rate of fly-wheel gear 51B is reduced, the above transmission between gear 51B and the feed-rolls is stepped up relatively higher, in order not merely to discount the reduced rate of gear 51B but further actually to increase the feed-rate of the rolls to the extent permitted by the several inch throw of eccentric 39B and the reduced R. P. M. of clutch L and eccentric 39B via the jackshaft JS.

In Figs. 5–11, the operative rate of intermittently driven eccentric shaft 42B is the same as the rate of the driven member of clutch LB, this being the fact in this particular case because here the clutch is mounted on the clutch-shaft, without any intermediate gearing, as in Figs. 1 and 4 stepping up the clutch-speed to the eccentric.

The following is an explanation of the operation and advantages of the last above described construction as in Figs. 9, 5–8, and 10–11, assuming any given desired rate of the variable speed electric motor PB, to permit keeping down the frequency of intermittent clutch-frequency for the shorter sheared sub-lengths.

In the first place, this novel combination provides a compact, powerful, and accurately operating intermittent drive for the offset 39B and the inter-sliding tool-carriers driven thereby, the rate of this drive being coordinated with that of the feed-rolls in such manner that the stock is fed at a high rate, providing a high production rate, which is of great value economically; and such high rate of production is obtained with a desirably low R. P. M. of the clutch (irrespective of the frequency of its intermittent tripping) which also is of economic importance because it prolongs the operative life of the wedging-roll clutch which otherwise is seriously shortened by intermittent applications of the heavy shearing loads even when a raked blade is employed for progressively shearing strip steel stock, when the clutch is given a high R. P. M. Here also the mounting of the driven element of the clutch directly on the offset-shaft 42B, greatly reduces the mass of the intermittent mechanism located between the driving element of the clutch, on the one hand, and tools GB and HB on the other, thereby contributing to accuracy of operation by facilitating the proper operation of the brake in promptly and accurately stopping such intermittent mechanism, when of such low mass, always at the same point after the above re-latching mechanism has caused removal of the wedging rolls from their locking positions driving said intermittent shear mechanism. The above useful reduction of the mass of the intermittently and rapidly moving parts, including the tools of constantly varying horizontal rate, is permitted by offset 39B for reasons stated below. And altho, as above, the advantageous mounting of the clutch directly on offset-shaft 39B, without any speed step-up to the shaft as in Figs. 1 and 4, causes the R. P. M. of said shaft to be no higher than that of the clutch, and would appear to compel a higher R. P. M. of the clutch corresponding to the above higher production rate by the feed-rolls, yet the fact is that in this third machine, the R. P. M. of the clutch actually can be desirably greatly reduced at the same time that the rate of the feed-rolls actually is desirably greatly increased. These apparently inconsistent results are not here due to the above transmissions from the motor respectively to the feed-rolls and clutch; and a machine having such coordinated motor connections giving a high rate to the feed-rolls and a low R. P. M. to the clutch, would be wholly inoperative as to its shearing functions if means were not provided between the clutch and the shearing tools to cause their motions to be coordinated accurately with the high stock-feed rate and the low R. P. M. of the clutch and the intermittent shaft 42B of short offset 39B. The means here employed, to preserve the desirably short horizontal stroke of only a few inches for the shearing tools, to preserve the desirably small mass of the intermittently started and braked mechanism between the tools and the clutch, and to provide for timely co-action of the tools with a high rate of stock feed by the feed-rolls while also providing for a low R. P. M. of the clutch which apparently is inconsistent with the high rate of stock-feed, is the novel arrangement of the intermittent tool-carriers and offset 39B wherein a short eccentric throw of sufficient length to cause timely strip-shearing by a raked blade which does not impart undue stresses to the roll-clutch, by slightly increasing the length of the short horizontal throw of the tools at constantly varying rate so as to allow time for the raked blade to complete shearing before its horizontal rate exceeds that of the stock, is sufficient also to provide for accurate and timely operation of the tools even when as above the feed-rate is increased greatly or the clutch R. P. M. reduced greatly, or both. For I have found that in different designs of this machine, for different feed-rolls, clutch R. P. M. and kinds of long narrow steel stock, very slight changes of the short intermittent offset throw, cause very surprising results in the control of the operation of the entire machine, in respect of the potentialities of desirable increases in production rate and in desirable reductions of clutch R. P. M. to prolong the operative life of the clutch. For example, an increase of only one-one hundredth of an inch of the throw of short offset 39B I have found increases production by about one-fifth of a mile of stock per twenty-four hour day, this result being based on the fact that the resulting slight increase of extent of vertical movement of revolving tool HB causes a corresponding slight increase of the horizontal rate of the tools, and that in turn permits the feed-roll rate to be increased accordingly. Thus, when the always short throw of the offset is increased from say, one and one-half inches, to the above practicable length of three and three-quarter inches (i. e., by over two hundreds of such increases of one one-hundredth of an inch) it is clear that by comparatively slight changes of the offset throw, the rate of feed may be increased to the full limit of speed of the feed-rolls at which they can feed and straighten the stock preliminary to shearing. Heretofore the production rate, even by intermittently reciprocating shear mechanism, has been far short of the capacity of the staggered feed rolls to straighten the long stock.

Furthermore, such increases in production rate are obtainable by this means hereof, without any increase of clutch R. P. M. for the purpose of causing timely shearing coaction of tools HB, GB in correspondence with the increased rate of the feed-rolls which accompanies a slight increase in the throw of the short-throw eccentric. This is because with an unchanged R. P. M. of clutch-shaft 42B, and with the reciprocation of carrier FB by the revolution of carrier 34B by offset 39B having a throw causing the higher feed-rate, the same higher horizontal rate of the tools which results in increased production rate also insures timely coaction of the tools at the same increased production rate, so that no increase of clutch R. P. M. is needed for cooperation with the higher feed-rate.

But, as shown in this third machine, where the jack-shaft JS and gearing are interposed between motor PB and clutch LB to reduce the R. P. M. of the latter, the provision of offset 39B permits the R. P. M. of the clutch thus actually to be reduced, while yet preserving a high (if not so high) feed-roll rate as the result of the high horizontal rate of the tools due to the increase of offset-throw to (for example) said three and three-quarter inch throw. And this reduction of clutch R. P. M. by jack-shaft JS, etc. may be, and is shown as permitted, in addition to the elimination of speed step-up gearing between the clutch and offset shaft 42B. All such desirable reductions of clutch R. P. M. are obtained as the result of the obtaining of a high horizontal rate of the tools by the several inch throw of the short eccentric which relieves the clutch itself of the duty of providing a high horizontal rate of the tools, as high as that of the stock, by more rapidly rotating offset 39B. That is, the increased throw of offset 39B instead of a higher clutch R. P. M. is the means of increasing the horizontal rate of the tools up to the increased rate of the feed-rolls. Thus in Figs. 5–11 a low R. P. M. of the short eccentric having only a several inch throw, controls and provides for the illustrated high feed rate (low ratio from motor to feed-rolls) and low clutch R. P. M. (high ratio from motor to clutch) both extremely desirable, especially the latter, in a machine of the general type hereof, and whether or not a raked blade be employed, or the tools be employed to shear steel strips. From the above it will be clear that on the basis of the short throw offset 39B of the order of at least a several inch throw, revolving the carrier 34B and thereby reciprocating carrier FB, the designer of any particular machine of the general type hereof including FB, 34B and 39B, may apportion the advantages of the several inch throw of the latter as may be desired in different designs of machine, between a high production rate and a low clutch R. P. M., the length of the short offset throw in any case determining the upper limits of the advantages as to either high production rate or low clutch R. P. M., but the apportioning of the advantages between the two being determined by the details of design of the coordinated transmissions in any given machine from the motor respectively to the feed-rolls and clutch, these two transmissions to be designed to cause the proper feed rate for a given desired clutch rate, and vice versa; but the two in any case being governed by the selected length of throw of at least several inches of the eccentric 39B in its novel relations with the two tool-carriers.

In all of Figs. 1, 4 and 5–11 the parts are shown on proper scale for practical operation as above, and in Figs. 1 and 4 are embodied the above advantages of high production and low clutch R. P. M., but principally of high production rate notwithstanding that in these Figs. 1 and 4 a speed step-up is interposed between the clutch and the offset shaft 39; said advantages resulting in each case from a short offset throw, for example, of three and three-quarter inches; giving a seven and one-half inch horizontal throw of the tools, constant for all sub-lengths of stock from three feet to twenty or more according to the adjustment at 65, K.

But in Fig. 5, as the result of the interposition of the jack-shaft JS and of the mounting of the clutch directly on offset-shaft 42B without any speed step-up for the revolution of offset 39B, the apportionment of the advantages of the offset is made principally for the more important object of further reducing the clutch R. P. M. rather than for the less important but yet very desirable object of increasing the rate of stock-feed and production; the same short offset throw being employed, but the R. P. M. of offset 39B being greatly reduced by the above low transmission ratio between the motor and offset-shaft 42B in Fig. 5, the result being the illustrated correspondingly high ratio of transmission from the motor to the feed-rolls so that the latter cause a stock feed no higher than the horizontal rate of offset 39B which has been made with sufficient throw to permit of the above reduction of clutch R. P. M.

I claim:

1. In a machine for the purpose described and including mechanism for shearing very long relatively narrow metal stock into sub-lengths, the combination with continuously operable mechanism feeding such stock horizontally lengthwise; of the shearing mechanism including two normally stationary intermittently movable shearing tools; two tool-carriers therefor of which the first is movable linearly along the length of the stock and the second is located above the stock-path, its tool being mounted on the lower portion; normally idle but intermittently revolvable short offset carrier-operating mechanism, said offset being located exclusively above the stock-path; at least one of the tool-carriers being mounted on and supported and carried by said offset mechanism and in a relatively sliding arrangement wherein the offset mechanism causes revolutionary movement of the second carrier and thereby causes reciprocating motion of the first carrier which is equal to the diameter of revolutionary movement of the second but short relative to the length of sheared sub-lengths; a positive-locking but quickly and uniformly acting clutch normally disconnected from the short-throw offset mechanism and coordinated with the stock-feeding mechanism; a singly adjustable master-control coordinated with the stock-feed and intermittently causing the clutch to be connected with said offset mechanism during single revolutions thereof and of said second carrier thereby; and means driving said feeding mechanism and clutch in coordinated time relation.

2. In a machine for the purpose described and including mechanism for shearing very long relatively narrow metal stock into sub-lengths, the combination with continuously operable mechanism feeding such stock horizontally lengthwise; of the shearing mechanism including two normally stationary intermittently movable shearing tools; two tool-carriers therefor of which the first is movable linearly along the length of the stock and the second located above the stock-path, the tool being mounted on the lower portion of the carrier; normally idle but intermittently revolvable short offset carrier-operating mechanism, said offset being located exclusively above the stock-path; at least one of the tool-carriers being mounted on and supported and carried by said offset mechanism in a relatively sliding arrangement of said two carriers with one another whereby the offset mechanism causes revolutionary movement of the second carrier and thereby causes said linear and reciprocatory motion of the first carrier along the stock-path by way of the revolution of the second which linear motion is equal in length to the diameter of revolution of the second carrier but short relative to the length of sheared sub-lengths; a positive-locking but quickly and uniformly acting clutch intermittently revolving said offset mechanism, but normally disconnected from the latter; a singly adjustable master-control coordinated with the stock-feed and intermittently causing the clutch to be connected with the offset mechanism; the throw of said offset mechanism being sufficient to compensate for the lack of speed step-up mechanism between said clutch and offset mechanism; and means driving said feeding mechanism and clutch in coordinated time relation.

3. In a machine for the purpose described and including mechanism for shearing very long relatively narrow metal stock into sub-lengths, the combination with continuously operable mechanism feeding such stock horizontally lengthwise; of the shearing mechanism including two normally stationary movable shearing tools; two tool-carriers therefor of which the first is movable linearly along the length of the stock and the second is located above the stock-path and revolvable along said path in a vertical plane, normally idle but intermittently revolvable short offset carrier-operating mechanism on which is mounted and supported at least one of said tool-carriers in a relatively sliding arrangement of said carriers with one another causing the offset mechanism to impart revolutionary motion to the second carrier and thereby impart said linear and reciprocatory motion to the first carrier which linear motion is equal in length to the diameter of revolution of the second carrier but short relative to the length of sheared sub-lengths; said offset being located above the stock-path; a single shaft located above the stock-path and normally stationary carrying said entire short offset mechanism and extending transversely of the stock above the stock-path; a positive locking but quickly and uniformly acting clutch normally disconnected from said offset mechanism; a singly adjustable master-control coordinated with the stock-feed and intermittently causing the clutch to be connected to said shaft; the short throw of said offset mechanism being sufficiently long to compensate for a lack of step-up mechanism between the clutch and the transverse shaft, by speeding up the movement of the tools along the stock-path notwithstanding the low rate of revolution of the offset mechanism in such lack of step-up mechanism; and means driving said feeding mechanism and clutch in coordinated time relation.

4. In a machine for the purpose described and including mechanism for shearing very long relatively narrow metal stock into sub-lengths, the combination with continuously operable mechanism feeding such stock horizontally lengthwise; of the shearing mechanism including two normally stationary but intermittently movable shearing tools; two normally stationary tool-carriers therefor of which the first is movable linearly along the length of the stock and the second is located above the stock-path and revolvable along said path in a vertical plane, normally idle but intermittently revolvable short offset carrier-operating mechanism on which is mounted and supported at least one of said tool-carriers in an inter-sliding arrangement of said carriers with one another causing the offset mechanism to impart revolutionary movement to the second carrier and thereby impart said linear and reciprocatory motion to the first carrier which linear motion is equal in extent to the diameter of revolution of the second carrier; said offset being located above the stock-path, a single shaft located above the stock-path and carrying said entire short-throw offset mechanism, and extending transversely of the stock above the stock-path; a positive-locking but quickly and uniformly acting clutch normally disconnected from said offset mechanism; means driving said feeding mechanism and clutch in coordinated time-relation; and a singly adjustable master-control coordinated with the stock-feed and intermittently causing such clutch to be connected with said offset mechanism.

5. In a machine for the purpose described, and including mechanism for shearing very long relatively narrow metal stock into sub-lengths, the combination with continuously operable mechanism feeding such stock horizontally lengthwise; of the shearing mechanism including two normally stationary intermittently movable shearing tools; two tool-carriers therefor of which the first is movable linearly along the length of the stock and the second is located above the stock-path and revolvable along said path in a vertical plane, the tool being mounted on the lower portion of the carrier; normally idle but intermittently revolvable short offset carrier-operating mechanism located exclusively above the stock-path; at least one of the tool-carriers being mounted on said offset mechanism in a relatively sliding arrangement of said carriers with one another whereby the offset mechanism imparts revolutionary motion to the second carrier and thereby imparts said linear and reciprocatory motion to the first carrier, which linear motion is equal in extent to the diameter of revolution of the second carrier, but short relative to the length of sheared sub-lengths; a positive-locking but quickly and uniformly acting clutch normally disconnected from the offset mechanism; a singly adjustable master-control coordinated with the stock-feed and intermittently causing the clutch to be connected with the offset mechanism; the throw of the short offset mechanism being of the order of several inches; and mechanisms respectively operating said feeding mechanism and the driving element of the clutch at rates coordinated with one another and with such length of throw of the offset mechanism.

6. In a machine for the purpose described, and including means for shearing very long relatively narrow metal strips into sub-lengths, the combination with continuously operable mechanism feeding such stock horizontally lengthwise; of the shearing mechanism including two normally stationary but intermittently movable shearing blades respectively located on opposite sides of the stock; two carriers therefor of which the first is movable linearly along the length of the stock and the second is located above the stock-path and revolvable along said path in a vertical plane, the tool being mounted on the lower portion of the carrier; at least one of said blades as the revolable one, having a raked edge transversely of the strip-stock; normally idle but intermittently revolvable short offset carrier-operating mechanism on which said carrier of the raked blade is mounted and supported in a relatively sliding arrangement of said carriers with one another causing the short-throw offset mechanism to impart revolutionary motion to the second carrier and thereby impart said linear and reciprocatory motion to the first carrier which linear motion is equal to the diameter of revolution of the second carrier; a positive-locking but quickly and uniformly acting clutch normally disconnected from the short offset mechanism; a singly adjustable master-control coordinated with the stock-feed and intermittently causing said clutch to impart a single revolution to said short throw offset mechanism; and power transmissions continuously operating the stock-feeding mechanism and the driving element of said clutch at coordinated rates; said short throw of said offset mechanism having a length which causes said raked blade to move across the entire width and thickness of the strip-stock before the rate of horizontal movement of the blades exceeds the rate of the stock-feed; and said power transmissions operating said feeding mechanism and the driving element of the clutch at rates not only coordinated with one another but with said length of throw of the offset mechanism.

7. A machine for the purpose described and including mechanism for shearing long relatively narrow metal stock into sub-lengths, the combination with continuously operable mechanism feeding the stock horizontally lengthwise; of two normally stationary but intermittently movable shearing tools; two carriers therefor of which the first is movable linearly along the length of the stock and the second is movable both along and across the stock-path; a normally idle shaft located horizontally above the stock-path; a positive-locking but quickly and uniformly acting clutch on said horizontal shaft but normally disconnected therefrom; a normally stationary but intermittently revolvable carrier-operating device offset from said same shaft and having a throw which is short relative to the length of sheared sub-lengths; the second of said tool-carriers being supported above the stock-path by being mounted on said offset device and revolvable by the shaft toward, across and away from the stock by way of its said mounting so offset from the shaft; said first carrier extending vertically both above and below the stock-path and constructed above the latter with vertical ways receiving the second carrier by which means the first carrier is reciprocated horizontally by the revolution of the second carrier by said offset device, over a distance determined by the throw of the offset device and the consequent diameter of revolution of the second carrier; said first carrier being constructed below said transverse shaft with a support for its tool and being formed also with a horizontal passage for the moving stock; means operating the stock-feeding mechanism and the driving element of the clutch continuously at coordinated rates; and adjustable means coordinated with the stock-feed and intermittently causing the clutch to be connected with said shaft for the offset device.

8. In a machine for the purpose described including means for fabricating very long relatively narrow metal stock at portions of its length spaced apart by uniform distances, the combination with continuously operable mechanism feeding such stock horizontally lengthwise; of two normally stationary carriers of which the second is located above the stock-path and is revolvable along said path in a vertical plane and at the lower portion carries a fabricating tool, and the first is reciprocable lengthwise of the stock, extends above and below the stock-path and is constructed above the stock-path with ways extending toward the stock, and is formed below the stock-path with a support for the moving stock, and is formed with a passage for the fed stock above said stock-support; the second carrier being constructed for sliding in said ways of the first carrier above the stock-path; a normally stationary short-throw offset carrier-operating device located exclusively above the stock-path and revolvable over a distance short relative to that between successively fabricated portions of the long stock, said second carrier being mounted on said offset device for support and revolution thereby and by said sliding relations of the carriers reciprocating the first carrier lengthwise of the stock; said arrangements reducing the size and weight of the second carrier and obviating need of a stock-passage therethru; a positive-locking but quickly and uniformly acting clutch normally disconnected from the offset device; a singly adjustable master-control coordinated with the stock-feed and intermittently causing the clutch to be connected with the offset device; and mechanism driving said feeding means and clutch at rates coordinated with one another and with the throw of said offset device.

9. In a machine for the purpose described and including mechanism for shearing very long relatively narrow metal stock into sub-lengths, the combination with continuously-operable mechanism feeding such stock horizontally lengthwise; of the shearing mechanism including two normally stationary shearing tools; two normally stationary tool-carriers one reciprocable linearly and horizontally along the stock-path and the second revolvable in a vertical plane along the stock-path; normally idle short-throw offset carrier operating mechanism; a shaft located above the stock-path transversely of the stock and on which shaft said offset mechanism is mounted and by which it is supported; at least said revolvable carrier being mounted on said offset mechanism and in a relatively sliding arrangement of the two carriers wherein the revolutionary movement imparted to the revolvable carrier causes reciprocation of the first carrier over a horizontal distance which is equal to the diameter of revolution of the offset device and revolvable carrier; said first or horizontally reciprocable carrier extending above and below the stock-path; its portion above said path being constructed with vertical ways receiving the second carrier mounted on the offset mechanism; and the portion of the first carrier below the stock-path being constructed with a support for its shearing tool, said first carrier being formed also with a horizontal passage for the fed stock; a positive-locking but quickly and uniformly-acting clutch intermittently rotating but normally disconnected from said offset mechanism shaft; adjustable means coordinated with the stock-feed and intermittently causing said clutch to be connected with said offset mechanism; and mechanism coordinated with the length of throw of said offset mechanism and continuously operating said feeding mechanism and the driving element of the clutch respectively at rates which cause the same rate of motion to the stock as that of the continuously varying motion of the carriers along the length of the stock, at the instant of shearing.

10. In a machine for the purpose described and including mechanism for shearing very long relatively narrow metal strips into sub-lengths, the combination with continuously operable mechanism feeding such stock horizontally lengthwise, of two normally stationary shearing blades; two normally stationary blade-carriers one reciprocable linearly and horizontally and the second revolvable vertically along the stock-path; the blade on said second carrier being mounted with a substantial rake of its edge; a normally idle intermittently revolvable offset carrier-operating device having a throw short relative to the length of sheared sub-lengths; a shaft located above the stock-path transversely of the stock and on which said offset device is mounted, at least said second carrier being mounted on and supported by said offset device and in a relatively sliding arrangement of said carriers imparting revolutionary motion to the second carrier and thereby imparting to the first carrier its linear motion to an extent equal to the diameter of revolution of the offset device and revolving carrier; the throw of said offset mechanism having a length causing completion of shearing by said raked edge blade before its rate along the stock path exceeds the rate of stock-feed; said first or horizontally moving carrier extending above and below the stock-path; its portion above said path being constructed with vertical ways receiving the revolving carrier mounted on the offset device, and the portion of said first carrier below said transverse shaft being constructed with a support for its blade, said first carrier being formed also with a horizontal passage for the fed stock; a positive-locking but quickly and uniformly acting clutch normally disconnected from but intermittently rotating said offset-mechanism shaft; adjustable means coordinated with the strip-feed and intermittently causing said clutch to be connected with said shaft for a single rotation of the latter; and mechanism coordinated with the edge-rake of said revolvable blade and with said short throw of the offset mechanism and operating said feeding mechanism and the driving element of the clutch respectively at rates which cause the same rate of motion of the stock as that of the constantly varying motion of the carriers along the stock, at the instant of shearing.

11. In a machine for the purpose described and including mechanism for shearing long relatively narrow metal stock into sub-lengths, the combination with continuously operable mechanism feeding such stock horizontally lengthwise, of two normally stationary shearing tools; two tool-carriers one linearly reciprocable horizontally, the second being revolvable vertically along the stock-path and constructed generally in a form having substantially less mass than the first, and the first carrier extending vertically between points above and below the stock-path and constructed above said path with ways for the sliding of said lighter revolvable carrier above the said path; the first carrier being constructed also with a horizontal passage for the moving stock and with a portion below the stock-path supporting its tool operatively below the tool on the revolvable carried, the said upper tool being mounted on the lower portion of the lighter revolvable carrier for pushing down thereby across the stock; a normally idle intermittently revolvable offset carrier-operating device connected to said second carrier supporting and revolving it; a shaft for said offset device extending transversely of the stock-path; a positive-locking but quickly and uniformly acting clutch; adjustable means coordinated with the stock-feed and intermittently causing said clutch to impart a single rotation to said offset device shaft; and braking means cooperating with said clutch, in imparting intermittent successive single revolutions to said shaft, offset device and revolvable tool-carrier.

12. In a machine for the purpose described and including mechanism for shearing long relatively narrow metal stock into sub-lengths, the combination with continuously operable mechanism feeding such stock horizontally lengthwise, of two normally stationary shearing tools, two tool-carriers one reciprocable linearly horizontally, the second at least being revolvable vertically along the stock-path and constructed in a form having less mass than the first carrier, and the first carrier extending vertically between points above and below the stock-path, and constructed above said path with ways for the sliding of the revolvable carrier vertically in a direction transverse to the stock-path; the first carrier being constructed also with a horizontal passage for the moving stock and with a portion supporting its tool operatively below the other tool which is mounted on the lower portion of the revolvable carrier for pushing down thereby; a normally idle carrier-operating eccentric connected to and revolving the second carrier; a shaft for said eccentric extending transversely of and above the stock-path; a positive-locking but quickly and uniformly-acting clutch of which the driving element is normally disconnected on said eccentric; a fly-wheel gear also normally disconnected from said eccentric but continuously rotating the driving portion of said clutch and connected with said stock-feeding mechanism to operate the latter in coordination with the eccentric shaft; and adjustable means coordinated with the stock-feed and intermittently causing said clutch to impart a single rotation to said shaft.

13. In a machine for the purpose described and including mechanism for shearing very long relatively narrow stock into sub-lengths, the combination with continuously operable mechanism feeding such stock lengthwise, of two normally stationary shearing tools; two carriers therefor of which the first is linearly reciprocable lengthwise of the stock, and the second revolvable in a plane along the stock path; said revolvable carrier being of substantially less mass than the first; a normally idle offset carrier-operating device supporting the lighter revolvable carrier and combined with the heavier first carrier in a relatively sliding arrangement of said carriers with one another imparting to the reciprocable heavier carrier its said linear movement by the revolution of the revolvable lighter carrier caused by the offset device, producing linear movement of the reciprocable carrier which is equal to the diameter of revolution of the revolvable carrier; a shaft carrying said offset mechanism; a positive-locking but quickly and uniformly acting clutch intermittently rotating said shaft; means coordinated with the stock-feed and intermittently acting to cause the clutch to rotate said shaft; a fly-wheel gear also mounted with and driving said clutch; said offset device having a general order of short throw of several inches; a main driver; a jack-shaft and gearing both located between the main driver and fly-wheel gear and effecting a low rate of R. P. M. of said clutch and offset shaft in coordination with said eccentric throw; and transmitting mechanism between the fly-wheel gear and the stock-feeding mechanism causing a high rate of stock-feed also in coordination with said offset throw.

14. In a machine for the purpose described and including mechanism for shearing very long relatively narrow metal stock into sub-lengths, the combination with continuously operable mechanism feeding such stock lengthwise, of two normally stationary shearing tools; two carriers of which the first is linearly reciprocable lengthwise of the stock, the second being constructed in a form having substantially less mass than the first, said second carrier being revolvable in a plane along the stock-path; the reciprocable carrier being constructed with ways for the sliding thereon of the second and being of substantially greater mass than the second; a normally idle offset carrier-operating device connected to said second or lighter revolvable carrier and supporting the latter in a relatively sliding arrangement of the two carriers with one another causing the revolution of the second carrier to impart said linear reciprocation to the first carrier to an extent which is equal to the diameter of revolution of the offset and the second carrier; a shaft bearing said offset device; a positive-locking but quickly and uniformly acting clutch having a continuously-rotated driving element; mechanism coordinated with the stock-feed and intermittently causing the clutch to revolve said offset-device, a fly-wheel gear continuously operating the driving element of said clutch; a main driver continuously driving said fly-wheel gear; said offset device having a general order of short throw of several inches; and transmitting mechanism from the fly-wheel gear to the stock-feeding mechanism of a ratio causing a rate of stock-feed coordinated with said offset-throw for a desirable low rate of said clutch.

15. In a machine for the purpose described and including mechanism for shearing very long relatively narrow metal stock into sub-lengths, the combination with continuously operable mechanism feeding such stock horizontally lengthwise, of two normally stationary shearing tools one movable linearly lengthwise of the stock, and the second being located above the stock-path and simultaneously revolvable in directions to and from and across the stock; a normally idle offset tool-operating device also located above the stock-path and supporting and revolving said revolvable tool in a circle of a diameter short relative to the length of sheared sub-lengths; a positive-locking but quickly and uniformly acting clutch; means coordinated with the stock-feed and causing the clutch to impart intermittent revolutions to said short-throw offset mechanism; the mechanism between the clutch and offset device including a shaft located above the stock-path and on which the clutch is mounted, the offset mechanism being carried by said revolvable same shaft; a carrier for said second tool, which carrier is connected directly to said offset mechanism; a carrier for the linearly movable first tool combined in direct inter-sliding relation with the carrier for the revolvable tool, the latter being mounted on and supported by said offset device and revolved thereby, the two carriers being given thereby the same range of movement along the stock-path by means of said sliding relation and said offset-mechanism.

16. In a machine for the purpose described and including mechanism for shearing very long relatively narrow metal stock into sub-lengths, the combination with continuously operable mechanism feeding such stock horizontally lengthwise, of two normally stationary shearing tools one linearly movable lengthwise of the stock, the second tool being simultaneously revolvable in directions to and from and across the stock and located above the stock-path; a normally idle offset tool-operating device located above the stock-path; a positive-locking but quickly and uniformly acting clutch; means coordinated with the stock-feed and causing the clutch to impart intermittent revolutions to said offset mechanism; the mechanism between the clutch and the offset device including a shaft located above the stock-path, and both the clutch and the offset device being carried by said shaft; a carrier for the revolvable tool and also located above the stock-path and connected directly to said offset device on the shaft, the tool being mounted on a lower portion of the carrier; and a carrier for the other tool combined with the revolvable-tool-carrier in a sliding relation of the two carriers directly with one another whereby the offset mechanism imparts equal ranges of movements to both the carriers and their tools, by way of the revolution of the second carrier which in turn reciprocates the other carrier linearly.

17. In a machine for the purpose described and including mechanism for shearing very long relatively narrow metal stock into sub-lengths, the combination with continuously operable mechanism feeding such stock horizontally lengthwise, of two normally stationary shearing tools, one linearly movable lengthwise of the stock, the second tool being simultaneously revolvable in directions to and from and across the stock and located above the stock-path; a normally idle harmonically-acting offset tool-operating device also located above the stock-path; a positive-locking but quickly and uniformly acting clutch; a singly adjustable master-control coordinated with the stock-feed and causing the clutch to impart intermittent single revolutions to said offset operating device; the mechanism between the clutch and the offset device including a shaft located above the stock-path and both the clutch and the offset mechanism being carried by said shaft; a carrier for the revolvable tool and located above the stock-path and connected directly to the offset device; and carrying its tool at a lower portion; and a carrier for the other tool and combined with the revolvable tool-carrier in a sliding relation of the two carriers directly with one another whereby the offset device imparts equal ranges of movements to both the carriers and their tools by way of revolution of the second carrier which causes reciprocation of the reciprocable tool-carrier, the latter carrier being started, reversed and stopped in harmonic motion also by each single revolution of said offset device.

18. In a machine for the purpose described and including mechanism for shearing very long relatively narrow metal stock into sub-lengths, the combination with means feeding said stock horizontally lengthwise, of two normally stationary shearing tools of which the first is linearly movable lengthwise of the stock, the second tool being simultaneously revolvable in directions to and from and across the stock and located above the stock-path; a normally idle harmonically-acting offset tool-operating mechanism also located above the stock-path; a positive-locking but quickly and uniformly acting clutch; a singly adjustable master control coordinated with the feeding mechanism and causing the clutch to impart intermittent single revolutions to said offset device of a diameter small relative to sheared sub-lengths; mechanism between the clutch and offset device and including two tool-carriers of which the carrier for the first tool extends on both sides of the stock-path and is formed with a passage for the advancing stock, said first tool and its carrier being movable exclusively rectilinearly along the length of the stock; the revolving tool-carrier being located above the stock-path and sliding directly along the first carrier to and from the stock; and a normally idle shaft extending above the stock-path said shaft being connected for rotation by the normally idle element of the clutch, and extending from opposite sides toward the revolvable tool-carrier; said offset mechanism being carried by said shaft and the revolving carrier being mounted on and carried and supported by said offset device, imparting equal ranges of movement to both the tools and their carriers along the stock-path and intermittently starting and reversing and stopping the first tool and its carrier in harmonic motion.

19. In a machine for the purpose described and including mechanism shearing very long relatively narrow metal strips, the combination with continuously operable mechanism feeding such stock horizontally lengthwise, of two normally stationary shearing tools; two cooperating relatively sliding blade-carriers of substantially different masses, the first being heavier and rectilinearly reciprocable horizontally and the second and lighter being revolvable vertically by way of its sliding relation to the first and thereby causing the motion of the first; a positive-locking but quickly and uniformly acting clutch; one of the tools being a blade having a raked edge transversely of the strip reducing instantaneous shearing loads on the clutch; a normally idle power transmitting system between the driving element of the clutch and said second and lighter carrier; said system being located above the stock-path and including a shaft and an offset device carried by said shaft, said revolvable carrier being mounted on and supported by said offset device and given a revolution thereby having a diameter short relative to the sheared strip sub-lengths; said carriers being combined in a relatively sliding arrangement wherein both are given the same range and rate of movement along the stock-path by the intermittent revolutions of said offset mechanism which cause the reciprocations of the first carrier; the throw of said offset mechanism having a length causing completion of the shearing action on the strip by the edge of said raked blade before the rate of movement of the revolving raked blade along the stock-path has exceeded the rate of the stock; said stock-feeding means and clutch having rates coordinated with said short offset throw causing the same rates of stock and carriers along the stock-path at the instant of shearing; the first and heavier carrier extending above and below the stock-path and provided above the stock-path with ways for the sliding of the revolving carrier; and the portion of said first carrier below the revolvable tool being formed with a passage for the stock fed horizontally to and beyond the tools.

20. In a machine of the type described, in which cold coiled metal stock is sheared into sub-lengths, the combination with a roll-stand including pinch feed-rolls moving the stock lengthwise, of a frame supporting the parts; two normally stationary shearing tools on opposite sides of the fed stock by which the latter is sheared successively into sub-lengths, the roll-stand including rolls by which the stock is both fed and straightened before reaching the shearing tools and passing between them; tool-carriers reciprocable lengthwise of the stock, of which the first and second are movable lengthwise of the stock and the second also to and from the stock and located above the stock-path and carries its tool at the lower portion; a positive-locking but quickly and uniformly acting clutch; a normally idle offset carrier-operating device located above the stock-path and supporting and revolving said second carrier, said offset mechanism itself and said first carrier being supported by said frame; the two carriers being combined in a direct sliding relation with one another causing equal ranges of movement of the two carriers by said offset operating device common to both of them; and a singly adjustable master-control coordinated with the stock-feed and causing the clutch to impart intermittent revolutions to said offset mechanism; said normally idle offset mechanism having a short throw of the general order of several inches; and continuously operating mechanisms driving the roll-stand rolls and continuously rotating the driving element of the clutch at rates coordinated with one another and with said offset throw.

21. In a machine for the purpose described and including mechanism for shearing very long relatively narrow metal stock into sub-lengths, the combination with continuously operable mechanism feeding such stock horizontally lengthwise, of two normally stationary shearing tools; two carriers therefor both movable lengthwise of the stock, and one also to and from the stock and located above the stock-path; normally idle carrier-operating mechanism located above the stock-path; a shaft also located above the stock-path and carrying said carrier-operating mechanism; a positive-locking but quickly and uniformly-acting clutch having a continuously-rotated driving element normally disconnected from said shaft; means arranged to brake said shaft; means coordinated with the stock-feed and cooperating with the clutch and braking means in causing intermittent single rotations of said shaft; and mechanism applying said brake during only a few degrees of shaft rotation at and about the time of approach of the shaft to the end of its single rotation.

22. In a machine for the purpose described including mechanism for shearing very long relatively narrow metal stock into sub-lengths, the combination with continuously operable mechanism feeding such stock horizontally lengthwise, of two normally stationary shearing tools; carriers therefor movable lengthwise of the stock, one being movable also to and from the stock and located above the stock-path; a normally idle shaft also located above the stock-path and carrying offset mechanism operating said carriers; a clutch having a continuously-rotating driving element normally disconnected from said shaft; means coordinated with the stock-feed and causing the clutch to impart intermittent rotations to said shaft; said offset mechanism in its normal position of rest extending substantially horizontally from said shaft; mechanism arranged to brake said intermittently rotating shaft; and mechanism applying said brake intermittently during times including the period of rest of the offset in said horizontal position, and including a few degrees of rotation at the end and beginning of the shaft movement.

23. In a machine for the purpose described and including mechanism for shearing very long relatively narrow metal stock into sub-lengths, the combination with continuously operable mechanism feeding such stock lengthwise; of two normally stationary shearing tools; carriers therefor of which the first and second both are movable lengthwise of the stock and the second is movable also to and from the stock; normally idle offset carrier-operating mechanism supporting said second carrier in a relatively sliding arrangement of the carriers whereby the offset mechanism imparts the same range of movement to both carriers, said range being short relative to sheared sub-lengths; a positive-locking but quickly and uniformly acting clutch; adjustable means coordinated with the stock-feed and causing the clutch to impart intermittent revolutions to the offset mechanism; said normally idle offset mechanism having a short throw of the general order of several inches; a main driver; a fly-wheel gear driven thereby and rotating with and continuously driving the driving element of said clutch; transmission mechanism between the main driver and the fly-wheel gear and including a jack-shaft and gearing rotating said fly-wheel gear, driving clutch-element and offset mechanism at a low rate and transmission mechanism between the fly-wheel gear and the stock-feeding mechanism having a step-up ratio.

24. In a machine for treatment of very long relatively narrow metal stock, the combination with continuously operable mechanism feeding such stock horizontally lengthwise; of a positive-locking but quickly and uniformly acting clutch; two cooperating relatively sliding carriers of substantially different masses, the first and heavier being rectilinearly slidable lengthwise of the stock and the second and lighter being located above the stock-path and having direct slidable relation with the first in directions to and from the stock; a fabricating tool mounted on the lower portion of the first and lighter tool-carrier; a normally idle transmission system between the clutch and said carriers; and a singly adjustable master control coordinated with the stock-feed and causing the clutch to impart intermittent revolutions to the second and light tool-carrier, said transmission between the clutch and the second carrier including an offset carrier-operating mechanism located above the stock-path and on which the second carrier is supported for revolution thereby; said offset mechanism having a short throw of the general order of several inches and being common to both carriers and moving them along the stock-path over the same range; said offset mechanism in its normal position of rest lying generally horizontally and extending in the direction of stock-feed, and the offset mechanism having a direction of revolution causing the revolvable second and lighter carrier to start in harmonic motion the reciprocable first and heavier carrier in the first quarter cycle of the second and lighter carrier; the intermittent non-harmonic starting carrier-motion toward maximum rate being limited to the second and relatively light tool-carrier, and the fabricating load being applied to the clutch in the third quarter cycle of the offset revolution, thereby being spaced in time from the starting load in the first cycle; and means causing continuous operation of the stock-feeding mechanism at a uniform rate coordinated with said offset throw.

25. In a machine for the purpose described and including mechanism for shearing very long relatively narrow metal stock into sub-lengths, the combination with continuously operable mechanism feeding such stock horizontally lengthwise, of a positive-locking but quickly and uniformly acting clutch; two normally stationary shearing tools of which the first and second are movable lengthwise of the moving stock and the second also movable to and from and across the stock; a singly adjustable master-control causing the clutch to be intermittently connected with and disconnected from said tools, said mechanism between the clutch and tools including a normally idle harmonically-acting offset tool-operating device located above the stock-path and having a short throw of the general order of several inches; the second tool having a carrier directly supported on said offset mechanism and revolvable thereby, said carrier thereby being also located above the stock-path and its tool being carried by a lower portion; the tools and said offset mechanism being combined in an arrangement causing the offset device to impart the same range of movement to both tools along the stock-path; and to impart the same constantly varying rates of motion to both tools along the length of the stock during an intermediate portion of each quarter cycle of revolution of the offset mechanism; and said offset mechanism having a fixed relation with the path of the moving stock which causes contact of the revolvable tool with the stock for shearing at the point of revolution of the offset when both tools are moving in the same direction as the stock and both at the same rate as the stock.

26. In a machine for the purpose described and including mechanism for shearing long metal strips into sub-lengths, the combination with continuously operable mechanism feeding such long strip horizontally lengthwise, of a positive-locking but quickly and uniformly acting mechanical clutch; two normally stationary cooperating inter-sliding tool-carriers, the first slidable along the length of the strip and the second revolvable and slidable directly against the first in directions to and from the strip, two normally stationary shearing tools mounted respectively on said carriers, one being a shearing blade on said revolvable carrier; a normally idle intermittently operated transmission system between the clutch and the tool-carriers; a singly adjustable master-control coordinated with the stock-feed and causing the clutch to impart intermittent single operating cycles to the two tool-carriers; all in combination with means reducing stresses on the intermittently-acting mechanical clutch at high production rates of the machine by reduction of masses of and stresses by the intermittently operated elements as follows:—(1) a less massive construction of the second tool-carrier than of the first tool-carrier, (2) an arrangement of the blade on said revolvable lighter carrier which provides a rake to the blade-edge transversely of the strip, (3) a normally idle offset carrier-operating device located above the stock-path and having a short throw of the general order of several inches, said revolvable carrier being located above the stock-path and directly supported by said offset-device, and the revolvable tool being mounted on the lower portion of said carrier, and (4) a shaft for said offset device and also located above the stock-path, said offset device and shaft being parts of said normally idle transmission system between the clutch and the tool-carriers, said offset device in its normal position of rest extending generally lengthwise of the stock in the direction of stock-feed whereby the heavier and reciprocating tool-carrier is started and reversed and stopped in harmonic motion and the non-harmonic starting motion of the combined carriers is limited to the lighter first-carrier, and whereby revolution of said second carrier starts the carriers in motion in a direction opposite to the stock feed, the shearing load occurring in the third quarter of revolution of the offset device and revolvable tool, providing a time-spacing between the starting load and the shearing load on the mechanical clutch from the shearing action of said raked blade; a variable speed driving means; and continuously operative power transmissions between said motor and the feeding mechanism and the driving member of the clutch respectively and apportioning the benefits of said short-throw offset device between the feeding mechanism and clutch providing desirably high feed-rates and desirably low clutch rates; said order of throw of said offset device being more than sufficient to cause completion of shearing of the strip by said raked blade before the constantly varying rate of movement of the revolving blade in the direction of stock feed has exceeded the rate of stock-feed, and such excessive length of offset throw contributing to said desirably high feed-rate and desirably low clutch-rate.

27. In a machine for the purpose described and including mechanism for shearing very long metal strips into sub-lengths, the combination with continuously-operable mechanism feeding such strips horizontally lengthwise; of two normally stationary shearing tools of which the first is linearly reciprocable lengthwise of the strip and the second is revolvable to and from and across the strip, the second tool being a blade arranged with a raked edge transversely of the strip; two carriers for said tools; the one for said raked blade being located above the stock-line and said blade being carried by the lower portion of the carrier; normally idle intermittently operated offset carrier-operating mechanism arranged with the two carriers for imparting equal ranges of motion to both carriers along the stock-path; a positive-locking but quickly and uniformly acting clutch; a singly adjustable master-control coordinated with the stock-feed and causing the clutch to impart intermittent revolutions to said offset mechanism; said normally idle offset mechanism having a length of throw which causes completion of shearing by said raked blade before the blade revolution causes its rate in the direction of stock-feed to exceed the rate of stock-feed; and power transmissions continuously driving the feeding mechanism and rotating the driving element of the clutch respectively at rates coordinated with one another and with the length of throw of said offset mechanism.

28. In a machine for the purpose described and including mechanism for shearing very long relatively narrow metal stock into sub-lengths, the combination with continuously operable mechanism feeding such stock longitudinally lengthwise, of two normally stationary shearing tools; two carriers therefor of which the first is reciprocably movable lengthwise of the stock and the second is revolvable to and from and across the stock and the tool being mounted on the lower portion of the carrier; normally idle offset carrier-operating mechanism supporting and intermittently revolving said second carrier in an inter-sliding arrangement of the carriers imparting equal ranges of motion to both carriers along the stock-path; a positive-locking but quickly and uniformly acting clutch; means coordinated with the stock-feed and causing the clutch to impart intermittent revolutions to said offset mechanism; said offset mechanism having a length of short throw of the general order of several inches and at least of a length causing completion of shearing by a tool arranged with a raked edge transversely of the stock, before the revolution of the tool by the offset mechanism has caused the rate of revolution of the tool in the direction of stock-feed to exceed the rate of stock-feed; and mechanisms operating at coordinated rates, and respectively continuously driving said feeding mechanism and continuously rotating the driving element of said clutch at rates coordinated with the throw of said offset mechanism.

29. In a machine for the purpose described and including mechanism for shearing very long relatively narrow metal stock into sub-lengths, the combination with continuously operable mechanism feeding such stock horizontally lengthwise, of two normally stationary shearing tools; two tool-carriers of which the first is reciprocable lengthwise of the stock and the second is located above the stock-path and revolvable to and from the stock, the tool being mounted on the lower portion of the carrier; a positive-locking but quickly and uniformly-acting clutch; normally idle offset carrier-operating mechanism supporting and intermittently revolving said second carrier and combined therewith in an inter-sliding arrangement imparting the same range of movement to the two carriers along the stock-path; means coordinated with the stock-feed and causing said clutch to impart intermittent revolutions to said offset mechanism; said normally idle offset mechanism having a short throw of the general order of several inches; and power transmissions respectively continuously operating said feeding mechanism and continuously rotating the driving element of said clutch, at rates co-ordinated with one another and with said throw of said offset mechanism.

30. In a machine for treatment of very long relatively narrow stock, the combination with continuously operable mechanism feeding such stock horizontally lengthwise, of a positive-locking but quickly and uniformly acting clutch; a fabricating tool located above the stock-path and revolvable along said path in directions to and from the stock, a carrier simultaneously reciprocable exclusively rectilinearly along the stock-path; a normally idle transmission system between the clutch and said fabricating tool; means coordinated with the stock-feed and causing the clutch to impart intermittent cycles of operation to said normally idle transmission system; all in combination with a normally idle offset device located above the stock-path revolving said fabricating tool along the stock-path and having a short throw of the general order of several inches;

said offset mechanism being part of said intermittently operated transmission system between said clutch and the fabricating tool; the revolved tool being supported by the offset mechanism and said carrier being reciprocated by the revolution of said offset mechanism over the same distance along the stock-path as the diameter of revolution of the fabricating tool; said offset mechanism being arranged for its normal position of rest above the stock-path in a generally horizontal position; said transmission system from the clutch intermittently starting revolution of the offset mechanism from said position of rest causing fabrication by said tool when the offset mechanism is at an angular position of about seven-thirty, thereby time-spacing the starting and fabricating loads on said clutch between said horizontal and angular positions of the offset-mechanism; and power transmissions respectively continuously operating said stock-feeding mechanism and continuously rotating the driving element of the clutch at rates coordinated with one another and with said throw of said offset mechanism.

31. In a machine for treatment of very long relatively narrow stock, the combination with continuously operable mechanism feeding such stock horizontally lengthwise, of a positive-locking but quickly and uniformly acting clutch; a fabricating tool located above the stock-path and revolvable along said path in directions to and from the stock; a carrier simultaneously reciprocable exclusively linearly along the stock-path; a normally idle power transmission system between the clutch and said fabricating tool; and means coordinated with the stock-feed and causing the clutch to impart intermittent cycles of operation to said normally idle system; all in combination with a normally idle harmonically-acting offset device located above the stock path and causing said intermittent revolutions of said fabricating tool and carrier-reciprocation along the stock path, and having a short throw of the general order of several inches; said offset mechanism being part of said intermittently operated transmission system between said clutch and fabricating tool; the tool being supported and revolved by said offset mechanism and said carrier being reciprocated by the revolution of said offset mechanism over the same distance along the stock-path as the diameter of revolution to the fabricating tool, and power transmissions respectively continuously operating said stock-feeding mechanism and continuously rotating the driving element of said clutch, at rates coordinated with one another and with said throw of said offset mechanism.

32. In a machine for fabricating very long relatively narrow stock, the combination with continuously operable mechanism feeding such stock horizontally lengthwise, of a positive-locking but quickly and uniformly acting clutch; two co-operating inter-sliding carriers, the first slidable in rectilinear reciprocation along the stock-path, and the second located above the stock-path and movable with the first, revolvable and slidable rectilinearly with reference to the first and in directions to and from the stock; a fabricating tool mounted on said revolvable carrier; a normally idle transmission system between said clutch and said revolvable carrier for the fabricating tool; means coordinated with the stock-feed and causing the clutch to impart intermittent revolutions to the tool-carrier and by way of said intersliding arrangement to impart to the first carrier the reciprocating movement thereof; all in combination with a normally idle offset device located above the stock-path and causing said movements of the inter-sliding carriers, and having a short throw of the general order of several inches; said offset mechanism being part of said intermittently operated transmission system between the clutch and tool, and said offset mechanism supporting said revolvable tool-carrier and moving both carriers the same distance along the stock-path as it moves the fabricating tool to and from the stock; and power transmissions respectively continuously operating said stock-feeding mechanism and continuously rotating the driving element of said clutch, at rates coordinated with one another and with said throw of said offset mechanism.

33. In a machine for shearing very long relatively narrow stock into sub-lengths, the combination with mechanism feeding such stock lengthwise, of normally stationary flying-shear mechanism intermittently reciprocable along the stock-path; driving means; transmission mechanism including a positive-locking but quickly and uniformly acting clutch between the driving means and the flying shear mechanism; means coordinated with the stock-feed and automatically intermittently connecting said clutch with and disconnecting it from said flying shear mechanism; transmission mechanism including a second clutch between said driving means and said stock-feeding mechanism and coordinated with said transmission to the fly-shear mechanism; and means manually operating said second clutch thereby controlling the stock-feeding mechanism without stopping the driving mechanism.

JOSEPH H. ROBERTS.